(12) United States Patent
Pina Ros et al.

(10) Patent No.: US 11,115,363 B1
(45) Date of Patent: Sep. 7, 2021

(54) UTILIZING ENCRYPTED EPHEMERAL MESSAGES TO MODIFY EPHEMERAL MESSAGE DURATION SETTINGS

(71) Applicant: WhatsApp LLC, Menlo Park, CA (US)

(72) Inventors: Santiago Pina Ros, Las Vegas, NV (US); Jimmy Enrico Jacques Holzer, Redwood City, CA (US); Shalini Sah, Menlo Park, CA (US); Elton Kyin-Fong Leong, San Gabriel, CA (US); Dafeng Ou, San Leandro, CA (US); Christopher Luc, San Francisco, CA (US); Nurzhan Bakibayev, London (GB); Zafir Khan, Redwood City, CA (US)

(73) Assignee: WHATSAPP LLC, Menlo Park, CA (US)

( * ) Notice: Subject to any disclaimer, the term of this patent is extended or adjusted under 35 U.S.C. 154(b) by 0 days.

(21) Appl. No.: 17/010,441

(22) Filed: Sep. 2, 2020

(51) Int. Cl.
  *H04L 12/58* (2006.01)
  *H04L 9/32* (2006.01)
  *H04L 29/06* (2006.01)

(52) U.S. Cl.
  CPC ............ *H04L 51/18* (2013.01); *H04L 9/3297* (2013.01); *H04L 51/16* (2013.01); *H04L 63/0428* (2013.01)

(58) Field of Classification Search
  CPC ....... H04L 51/18; H04L 51/16; H04L 9/3297; H04L 63/0428
  See application file for complete search history.

(56) References Cited

U.S. PATENT DOCUMENTS

| | | | | |
|---|---|---|---|---|
| 9,294,425 | B1* | 3/2016 | Son | H04L 51/18 |
| 9,906,479 | B1* | 2/2018 | Son | H04L 51/046 |
| 9,935,914 | B2* | 4/2018 | Prado | H04W 12/041 |
| 10,178,062 | B2* | 1/2019 | Brooks | H04L 67/125 |
| 10,616,162 | B1* | 4/2020 | Zhao | H04L 51/10 |
| 2005/0144352 | A1* | 6/2005 | Wu | H04L 9/3297 |
| | | | | 711/100 |
| 2010/0298014 | A1* | 11/2010 | Kamphuis | H04L 51/38 |
| | | | | 455/466 |
| 2017/0171131 | A1* | 6/2017 | Steiner | H04L 51/02 |
| 2017/0353416 | A1* | 12/2017 | Brooks | H04L 67/10 |

(Continued)

*Primary Examiner* — Alina A Boutah
(74) *Attorney, Agent, or Firm* — Keller Jolley Preece

(57) ABSTRACT

The present disclosure relates to systems, non-transitory computer-readable media, and methods for dynamically controlling ephemeral messaging threads and ephemeral message duration settings across computing devices while improving security by maintaining end-to-end encryption. In particular, in one or more embodiments, the disclosed systems can transmit encrypted ephemeral messages, including ephemeral message duration settings and ephemeral setting timestamps. The disclosed systems can decrypt received messages on receiving client devices and dynamically apply ephemeral message duration settings to different message threads. For example, the disclosed systems can modify existing duration settings at a receiving client device to match a received ephemeral message duration setting based on determining that the received ephemeral setting timestamp predates an existing setting timestamp. Further, the disclosed systems can apply the ephemeral message duration setting to delete ephemeral messages from an ephemeral message thread.

20 Claims, 15 Drawing Sheets

(56) References Cited

U.S. PATENT DOCUMENTS

| | | | | |
|---|---|---|---|---|
| 2018/0278562 A1* | 9/2018 | Tang | ........................ | H04L 51/16 |
| 2018/0373794 A1* | 12/2018 | Dimson | ................. | G06N 7/005 |
| 2019/0097964 A1* | 3/2019 | Martinazzi | .............. | H04L 51/32 |
| 2020/0193482 A1* | 6/2020 | Howard | ............. | G06Q 30/0267 |

* cited by examiner

UTILIZING ENCRYPTED EPHEMERAL MESSAGES TO MODIFY EPHEMERAL MESSAGE DURATION SETTINGS

BACKGROUND

Recent years have seen rapid development in computer systems that generate and disseminate digital communications across client devices via computer networks. Indeed, as a result of technological advances in smartphones, tablets, laptops, computers, smart watches, smart televisions, and other computing devices, conventional systems can transmit a variety of different digital communications, including digital chat messages, digital video messages, and/or ephemeral messages with limited time durations. Although such conventional systems allow client devices to generate, send, and receive a variety of digital messages. including ephemeral digital messages, these systems have a number of technological shortcomings.

For instance, although conventional messaging systems can transmit ephemeral messages between client devices, these systems often have significant problems with regard to security, efficiency, and flexibility of operation. To illustrate, many conventional systems provide ephemeral messages by utilizing one or more online servers to store, manage, and delete ephemeral messages upon expiration. However, such conventional messaging systems store ephemeral messages and corresponding settings at the online servers. This server-side implementation exposes the digital messages and corresponding settings to potential data breaches. Indeed, recent years have seen a number of examples of digital pirates exposing confidential information stored on private servers of conventional systems. Accordingly, even though ephemeral messages are intended to improve security (e.g., by being deleted after certain time durations) conventional systems often expose confidential messages and settings to potential piracy.

In addition to security concerns, conventional messaging systems are often inefficient. Indeed, conventional systems often utilize remote servers to process, store, and manage digital ephemeral communications and corresponding account settings. This approach requires significant server processing resources and communication bandwidth in processing millions of digital communications across client devices.

Some conventional systems seek to address the foregoing concerns by imposing inflexible, rigid requirements. For example, some conventional systems impose the same ephemeral message settings across client devices and message threads in an effort to avoid the technological problems discussed above. This rigid approach, however, deprives conventional systems of flexible functionality in managing ephemeral content across message threads.

These and other problems exist with regard to conventional digital communications systems for communicating and sharing digital messages with other users.

BRIEF SUMMARY

Embodiments of the present disclosure provide benefits and/or solve one or more of the foregoing or other problems in the art with systems, non-transitory computer-readable media, and methods for maintaining ephemeral messaging threads by utilizing client-side encryption, transmission, decryption, and management of ephemeral messages and ephemeral message duration settings. More specifically, the disclosed systems can bypass server device management of ephemeral messages and corresponding ephemeral message threads settings by implementing end-to-end encryption of ephemeral digital messages and ephemeral message settings within digital communications between client devices.

To illustrate, utilizing the disclosed systems, transmitting client devices can generate encrypted digital communications that include ephemeral messages, ephemeral message duration settings, and ephemeral setting timestamps. Moreover, receiving client devices can utilize the disclosed systems to decrypt incoming digital communications, and analyze the ephemeral messages, ephemeral message duration settings, and the ephemeral setting timestamps. More specifically, the disclosed systems can decrypt an ephemeral message and add the ephemeral message to an ephemeral message thread. Further, the disclosed systems can compare an ephemeral setting timestamp to an existing setting timestamp to manage updates to existing ephemeral message duration settings. For example, based on determining that an ephemeral setting timestamp postdates an existing setting timestamp, the disclosed systems can update and apply ephemeral message duration settings (e.g., to delete the ephemeral message from the ephemeral messaging thread after a period of time designated by the ephemeral message duration setting). In this manner, the disclosed systems can bypass server-side analysis, while securely, efficiently, and flexibly managing ephemeral messages and ephemeral message threads across client devices.

In addition, the disclosed systems can also manage ephemeral messages threads across client devices through broadcast ephemeral messages. Indeed, the disclosed systems can utilize a transmitting device and a single user interface to generate a broadcast ephemeral message for distribution to multiple client devices. Based on user interaction with the user interface, the disclosed systems can transmit the broadcast ephemeral message to client devices while maintaining individualized ephemeral message settings across different message threads. Specifically, the transmitting client devices can utilize the disclosed systems to generate and transmit encrypted digital communications that include the same ephemeral message, but different ephemeral message settings. Accordingly, receiving devices can analyze the digital communications, identify the ephemeral message, and flexibly apply different ephemeral message settings to the same ephemeral message. Moreover, the disclosed systems can do so without exposing the ephemeral message or the ephemeral message settings to a remote server.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
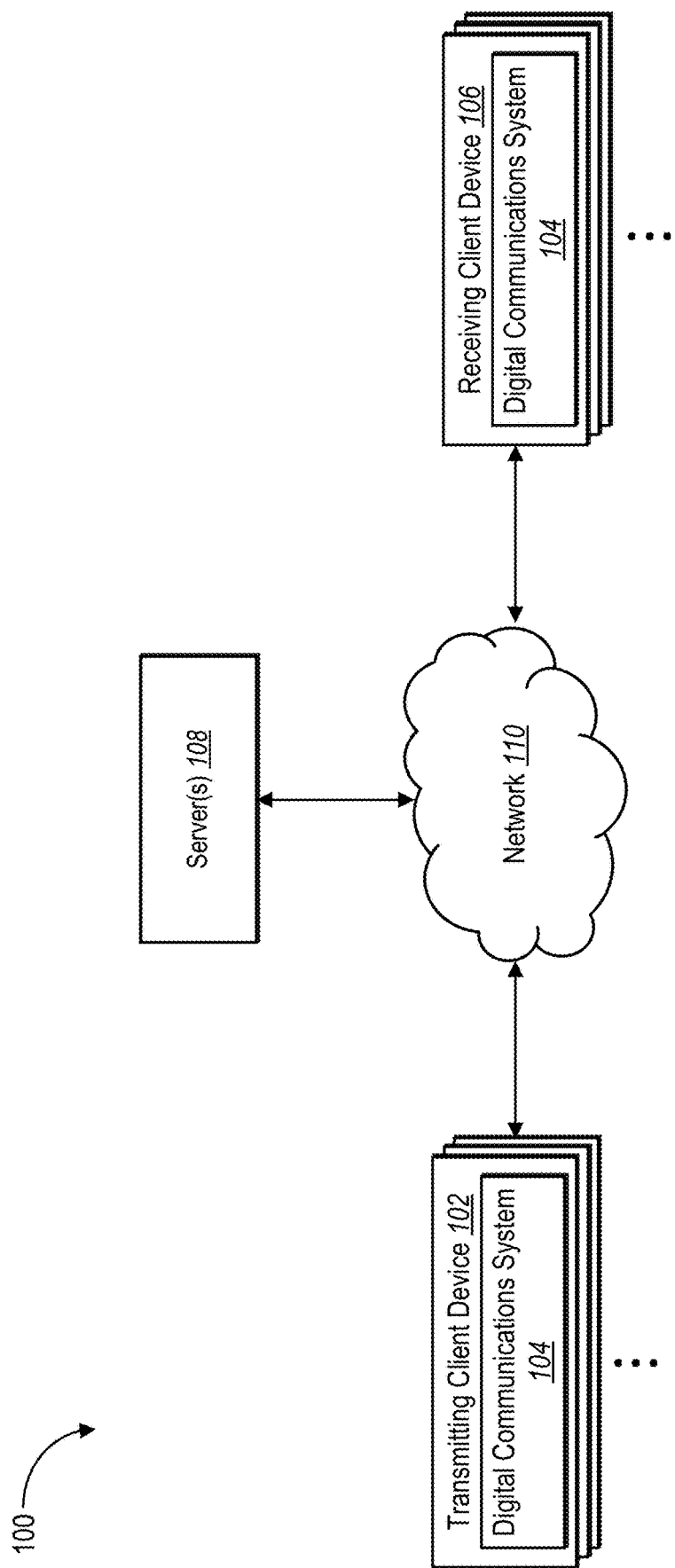
FIG. 1 illustrates a diagram of an environment in which a digital communication system can operate in accordance with one or more embodiments.

This disclosure describes one or more embodiments of a digital communication system that dynamically controls encrypted ephemeral messaging and ephemeral message duration settings across client devices, while preserving digital privacy by avoiding exposure at remote servers. More specifically, the digital communication system can dynamically control ephemeral messaging threads via receiving client devices and transmitting client devices while maintaining end-to-end encryption during transmission. To illustrate, the digital communication system can utilize transmitting devices to generate encrypted digital communications comprising ephemeral messages, ephemeral message duration settings, and ephemeral setting timestamps. Receiving client devices can decrypt the digital communications and manage ephemeral message threads with corresponding settings. For example, the digital communication system can utilize a receiving client device to compare an ephemeral setting timestamp to an existing setting timestamp to determine whether to update an ephemeral message duration setting. Further, the digital communication system can apply ephemeral message duration settings to delete ephemeral messages from ephemeral message threads at the transmitting client devices and receiving client devices. In this manner, the digital communication system can flexibly apply different ephemeral message settings to different ephemeral message threads across client devices, while maintaining end-to-end encryption and avoiding digital security breaches at remote servers.

As just mentioned, the digital communication system can utilize a transmitting client device to generate an ephemeral message (e.g., a digital message that is deleted based on a specified time duration). Indeed, a transmitting client device can maintain multiple ephemeral message threads reflecting digital communications with other client devices. Each ephemeral message thread can include different ephemeral message settings. For example, each message thread can include an ephemeral message duration setting, which specifies a different length of time before an ephemeral message in the ephemeral message thread is deleted.

The digital communication system can utilize client devices to modify these ephemeral message thread settings. For example, based on user interaction at a user interface of a client device, the digital communication system can modify an ephemeral message duration setting for different ephemeral message threads. To illustrate, based on user selection, the digital communication system can modify an ephemeral message duration setting from one hour to one day (meaning that ephemeral messages will be deleted one day after a triggering event).

Modifications to message thread settings can impact both transmitting client devices and recipient client devices (e.g., the ephemeral message duration setting can impact how ephemeral messages are deleted on all client devices). Accordingly, it is imperative to accurately synchronize these settings across client devices while also maintaining digital privacy. Thus, as mentioned above, the digital communication system can utilize a transmitting device to generate encrypted digital communications that include an ephemeral message and corresponding ephemeral message duration settings. Indeed, the digital communication system can encrypt an ephemeral message, an ephemeral message duration setting, and an ephemeral setting timestamp so that only the intended receiving client device can receive and implement the ephemeral message.

Moreover, the digital communication system can transmit the encrypted digital communication (e.g. from the transmitting client device to the receiving client device) while maintaining encryption during transmission. More specifically, the digital communication system can transmit the encrypted digital communication utilizing one or more servers, without decrypting the encrypted digital communication at the one or more servers. Thus, the digital communication system can transmit the ephemeral message to a receiving client device without providing any server with access to the ephemeral message, the ephemeral message duration setting, or the ephemeral setting timestamp.

Further, the digital communication system can utilize a receiving client device to receive and decrypt the encrypted digital communication. More specifically, the digital communication system can receive (e.g. via a receiving client device) and decrypt ephemeral messages, ephemeral message duration settings, and/or ephemeral setting timestamps. Additionally, the digital communication system can identify an ephemeral message thread corresponding to the received ephemeral message and add the ephemeral message to that ephemeral message thread.

In some embodiments, the digital communication system compares a received ephemeral setting timestamp to an existing setting timestamp to determine whether to modify the existing message duration setting. More specifically, the digital communication system can identify an existing ephemeral message duration setting and a corresponding existing setting timestamp. Further, the digital communication system can compare the received ephemeral setting timestamp to the existing setting timestamp. If the digital communication system determines that the existing setting timestamp predates the ephemeral setting timestamp, the digital communication system can modify the existing ephemeral message duration setting to match the ephemeral message duration setting.

Additionally, in one or more embodiments, the digital communication system deletes ephemeral messages from ephemeral message threads by applying an ephemeral message duration setting. More specifically, the digital communication system can identify an ephemeral message duration setting for an ephemeral messaging thread. Then, the digital communication system can determine "expiration" times to delete ephemeral messages on the ephemeral messaging thread. For example, the digital communication system can determine time from a designated triggering event (e.g., a receiving client device accessing the ephemeral message, a receiving client device receiving the ephemeral message, or a receiving client device initiating a session with an ephemeral message application) and delete the ephemeral message when the time reaches the ephemeral message duration setting. Accordingly, the digital communication system can apply the ephemeral message duration setting to delete an ephemeral message.

As mentioned, the digital communication system can also generate and transmit broadcast ephemeral messages to multiple ephemeral message threads and multiple receiving client devices. More specifically, the digital communication system can receive user input at a transmitting device indicating an ephemeral message and multiple receiving client devices. The digital communication system can transmit encrypted digital communications to the various receiving client devices and/or messaging threads. More specifically, the digital communication system can transmit encrypted digital communications that include the ephemeral message together with different ephemeral message duration settings applicable to each individual message thread. Accordingly, the digital communication system can securely transmit a broadcast ephemeral message to multiple client devices while flexibly utilizing a variety of different ephemeral message settings across different message threads.

The digital communication system can provide many technical advantages and benefits over conventional systems and methods. For example, by maintaining end-to-end encryption of ephemeral messages and ephemeral message settings in transmitting digital communications across client devices, the digital communication system can improve security relative to conventional systems. Specifically, the digital communication system can transmit and receive ephemeral messages, ephemeral message duration settings, and ephemeral setting timestamps while maintaining end-to-end encryption and without exposing this digital, private information to remote servers. The digital communication system thus prevents unauthorized access of ephemeral message content and maintains improved user privacy.

Further, the digital communication system can also improve efficiency relative to conventional systems. Indeed, as described above, the digital communication system can avoid storing or managing ephemeral messages and ephemeral message settings at remote servers. Accordingly, the digital communication system can maintain functionality of ephemeral messages across client devices while significantly reducing processing resources and communication bandwidth of implementing server devices. In addition, the digital communication system can also improve efficiency by reducing user interaction through efficient user interfaces that intelligently transmit broadcast ephemeral messages (with different ephemeral message settings) across multiple client devices through a single user interface. Thus, the digital communication system not only reduces server resources but also provides more efficient dynamic management of various ephemeral messaging threads at client devices as well.

While improving security and efficiency, the digital communication system can also flexibly manage different settings for different ephemeral message threads across client devices. Indeed, the digital communication system can allow client devices to select different ephemeral message duration settings for different message threads and dynamically synchronize these settings to other client devices corresponding to the message threads. Thus, the digital communication system can flexibly and efficiently manage ephemeral messages in accordance with a variety of different ephemeral message settings, while maintaining the security of the ephemeral messages and corresponding ephemeral message settings.

As illustrated by the foregoing discussion, the present disclosure utilizes a variety of terms to describe features and advantages of the digital communication system. Additional detail is now provided regarding the meaning of such terms. For example, as used herein, the term "ephemeral message" refers to a digital communication that expires or disappears from view (e.g., after a specified event and/or a predetermined time). In particular, the term "ephemeral message" can include a digital communication (e.g., an instant message or SMS message) that is hidden, removed, or deleted after a triggering event and corresponding time duration. An ephemeral message can include digital communications that contain a variety of digital content, such as digital text, digital images, or digital videos (or a combination thereof). Thus, an ephemeral message can include digital text (in conjunction with a video or digital image) that is removed from a from a messaging thread after a threshold time duration upon being accessed by the receiving client device.

Similarly, as used herein, the term "broadcast ephemeral message" refers to an ephemeral message transmitted to a plurality of client devices. In some embodiments, a broadcast ephemeral message includes an ephemeral message transmitted to multiple ephemeral messaging threads. In some embodiments, a broadcast ephemeral message is transmitted to both an ephemeral message thread and a persistent message thread (so that the broadcast ephemeral message is removed from the ephemeral message thread but remains in the persistent message thread). This disclosure refers to such a message as a broadcast ephemeral message so long as it is transmitted to (or included in) at least one ephemeral message thread.

Further, as used herein, the term "ephemeral message duration setting" refers to a period of time designated before removal of an ephemeral message from view. In particular, the term "ephemeral message duration setting" can include a portion of an ephemeral message (e.g. an ephemeral message data packet) designating a period of time before expiration of ephemeral messages in a particular ephemeral message thread. To illustrate, an ephemeral message duration setting can include 5 minutes, 25 minutes, 1 hour, 24 hours, etc. The digital communication system can also set an ephemeral message duration setting to never expire (thus converting an ephemeral message to a digital message that will not be deleted). Relatedly, an existing ephemeral duration setting can include an ephemeral message duration setting already and/or previously applied to an ephemeral messaging thread.

Additionally, as used herein, the term "ephemeral setting timestamp" refers to a digital record of the time at which an ephemeral setting is created, modified, revised, and/or received. In particular, the term "ephemeral setting timestamp" can include a digital record of a time at which a client device receives user input of an ephemeral message duration setting (e.g., a timestamp when an ephemeral message duration setting is changed at a client device). In some embodiments, the digital communications system 104 can utilize ephemeral setting timestamps to determine whether and how to update ephemeral message duration settings. Relatedly, an existing setting timestamp can include a digital record of the time of occurrence of designating an existing ephemeral duration setting.

Also, as used herein, the term "message thread" refers to a set of messages between two client devices (or corresponding user accounts). A message thread can include one or more messages transmitted between a transmitting device and receiving device (or corresponding user accounts). Moreover, a message thread can include a collection of messages accessible to designated client devices (or corresponding user accounts). Relatedly, an ephemeral message thread can include a message thread including (or previously including) one or more ephemeral messages.

Further, as used herein, the term "encrypted digital communications" refers to an electronic message that has been encrypted (e.g., utilizing an encryption algorithm). As described in greater detail below, the digital communication system can encrypt a variety of digital data to include in an encrypted digital communication, such as ephemeral messages, ephemeral message duration settings, and/or ephemeral setting timestamps digitally concealed to prevent unauthorized access. To illustrate, an encrypted digital communication can include an end-to-end encrypted ephemeral message that is encrypted at a transmitting device and only decrypted at a recipient client device (not an intermediate server device).

Additional detail will now be provided in relation to illustrative figures portraying example embodiments and implementations of the digital communications system. For example, FIG. 1 illustrates a computing system environment (or "system") 100 for implementing a digital communications system in accordance with one or more embodiments. As shown in FIG. 1, the system 100 includes a transmitting client device 102, including a digital communications system 104, a receiving client device 106, also including the digital communications system 104, server(s) 108, and a network 110. Each of the components of the system 100 can communicate via the network 110, and the network 110 may be any suitable network over which computing devices can communicate. Example networks are discussed in more detail below in relation to FIG. 9.

As shown in FIG. 1, the system 100 includes the transmitting client device 102 and the receiving client device 106. Though FIG. 1 illustrates one transmitting client device 102 and one receiving client device 106, it will be appreciated that the system 100 can include any number of transmitting client devices 102 and receiving client devices 106. The transmitting client device 102 and the receiving client device 106 can each be one of a variety of computing devices, including a smartphone, tablet, smart watch, smart television, desktop computer, laptop computer, virtual reality device, augmented reality device, or other computing device as described in relation to FIG. 9.

In one or more embodiments, the transmitting client device 102 and the receiving client device 106 correspond to one or more user accounts (e.g., user accounts stored at the server(s) 108). For example, a user of the transmitting client device 102 can establish a user account with login credentials and a user of the receiving client device 106 can establish a user account with login credentials. The server(s) 108 can transmit messages between the transmitting client device 102 and the receiving client device 106 by confirming that the transmitting client device 102 and the receiving client device 106 have the appropriate privileges associated with the corresponding user accounts. Accordingly, users can utilize multiple devices (e.g., multiple transmitting client devices or multiple receiving client devices) with the appropriate privileges associated with the corresponding user accounts. The present disclosure utilizes transmitting client devices and receiving client devices to refer to devices associated with these user accounts. Thus, in referring to a transmitting client device or a receiving client device, the disclosure and the claims are not limited to communications with a specific device, but any device corresponding to an account of a particular user. Accordingly, in using the term receiving client device, this disclosure refers to any computing device corresponding to a receiving user account. Similarly, in using the term transmitting client device, this disclosure refers to any computing device corresponding to a transmitting user account.

In addition, the transmitting client device 102 and the receiving client device 106 can further communicate with the server(s) 108 via the network 110. For example, the transmitting client device 102 can transmit an ephemeral message to the receiving client device 106 via the network 110 and the server(s) 108. Further, the transmitting client device 102 can transmit an ephemeral message duration setting and an ephemeral setting timestamp to the receiving client device 106 via the network 110 and the server(s) 108.

As illustrated in FIG. 1, the system 100 includes the server(s) 108. The server(s) 108 may execute, generate, store, receive, and transmit electronic data, such as executable instructions for dynamically controlling ephemeral message threads. For example, the server(s) 108 can maintain end-to-end encryption of ephemeral messages, ephemeral message duration settings, and ephemeral setting timestamps. Accordingly, ephemeral messages can pass through the server(s) 108 without any encrypted content becoming available on the server(s) 108. In some embodiments, the server(s) 108 comprises a distributed server where the server(s) 184 includes a number of server devices distributed across the network 110 and located in different physical locations. The server(s) 108 can comprise a content server, an application server, a communication server, a web-hosting server, or a machine learning server.

Although FIG. 1 depicts the digital communications system 104 located on the transmitting client device 102 and the receiving client device 106, in some embodiments, the digital communications system 104 can be implemented by one or more other components of the system 100 (e.g., by being implemented entirely or in part at one or more of the other components). Additionally, although not illustrated in FIG. 1, in some embodiments, the system 100 may have a different arrangement of components and/or may have a different number or set of components altogether.

Figure 2:
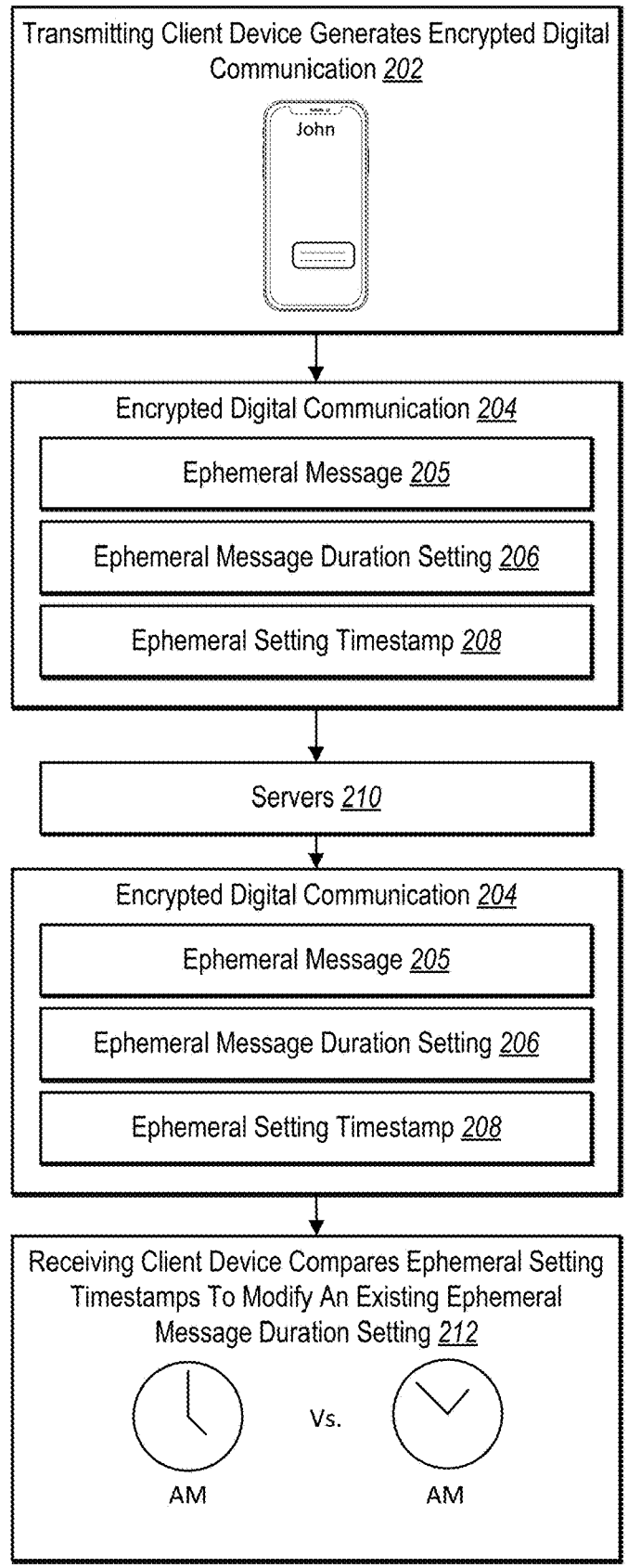
FIG. 2 illustrates an overview diagram of updating an ephemeral message duration setting based on a received encrypted ephemeral message in accordance with one or more embodiments.

As mentioned above, the digital communications system 104 can dynamically control ephemeral messaging while maintaining end-to-end encryption of ephemeral messages. FIG. 2 illustrates an overview of an example transmission of an encrypted ephemeral message. For example, FIG. 2 illustrates that the digital communications system 104 can perform an act 202 of the transmitting client device generating an encrypted digital communication.

The digital communications system 104 can generate ephemeral messages at the transmitting client device of a variety of types based on received input at the transmitting client device. Further, the digital communications system 104 can generate an ephemeral message duration setting for the ephemeral message based on user input at the transmitting client device. For example, the digital communications system 104 can detect user input at the transmitting client device selecting an updated ephemeral message duration setting. In another example, the digital communications system 104 can determine a lack of such user input at the transmitting client device (e.g., the digital communications system 104 can utilize an existing ephemeral message duration setting). Additionally, the digital communications system 104 can generate an ephemeral setting timestamp based on the time of that ephemeral message duration setting is changed at the transmitting client device (e.g., when the transmitting client device receives user input modifying the ephemeral message duration setting).

As also shown in FIG. 2, the digital communications system 104 can generate and transmit the encrypted digital communication 204, including the ephemeral message 205, the ephemeral message duration setting 206 and the ephemeral setting timestamp 208. The digital communications system 104 can transmit the encrypted digital communication 204 over the server(s) 210. As shown in FIG. 2, the server(s) 210 can transmit the ephemeral message 204 to the receiving client device. Further, as discussed above, the server(s) 210 can maintain the end-to-end encryption of the encrypted digital communication 204 (including the encryption of the ephemeral message 205, the ephemeral message duration setting 206, and the ephemeral setting timestamp 208) during transmission. Thus, the server(s) 210 can receive the encrypted digital communication 204 and transmit the encrypted digital communication 204 without making any portion of the ephemeral message 205, the ephemeral message duration setting 206, and the ephemeral setting timestamp 208 available on the server(s) 210.

FIG. 2 illustrates that a receiving client device can receive the encrypted digital communication 204, including the ephemeral message 205, the ephemeral message duration setting 206, and the ephemeral setting timestamp 208. As further shown in FIG. 2, the digital communications system 104 can perform an act 212 of the receiving client device comparing ephemeral setting timestamps to modify an existing ephemeral message duration setting. More specifically, the digital communications system 104 can compare the ephemeral setting timestamp 208 and an existing setting timestamp for the ephemeral message thread to determine which is the most recent.

Further, based on determining that the ephemeral setting timestamp 208 is more recent than the existing setting timestamp, the digital communications system 104 can modify the ephemeral message duration setting for the ephemeral message thread to match the ephemeral message duration setting 206. Thus, the digital communications system 104 can update the ephemeral message duration setting for an ephemeral message thread via the receiving client device. Accordingly, the digital communications system 104 can update ephemeral message duration settings without any need for the server(s) 210 to access the ephemeral message duration setting 206.

In one or more embodiments, the digital communications system 104 can dynamically control multiple different threads corresponding to multiple different ephemeral message duration settings on a single client device (e.g. a transmitting client device and/or a receiving client device). The digital communications system 104 can modify an ephemeral message duration setting for one ephemeral messaging thread without modifying another ephemeral messaging thread. Further, the digital communications system 104 can dynamically control both ephemeral and persistent messaging threads on a single client device and/or associated with a single user account.

Figure 3A:
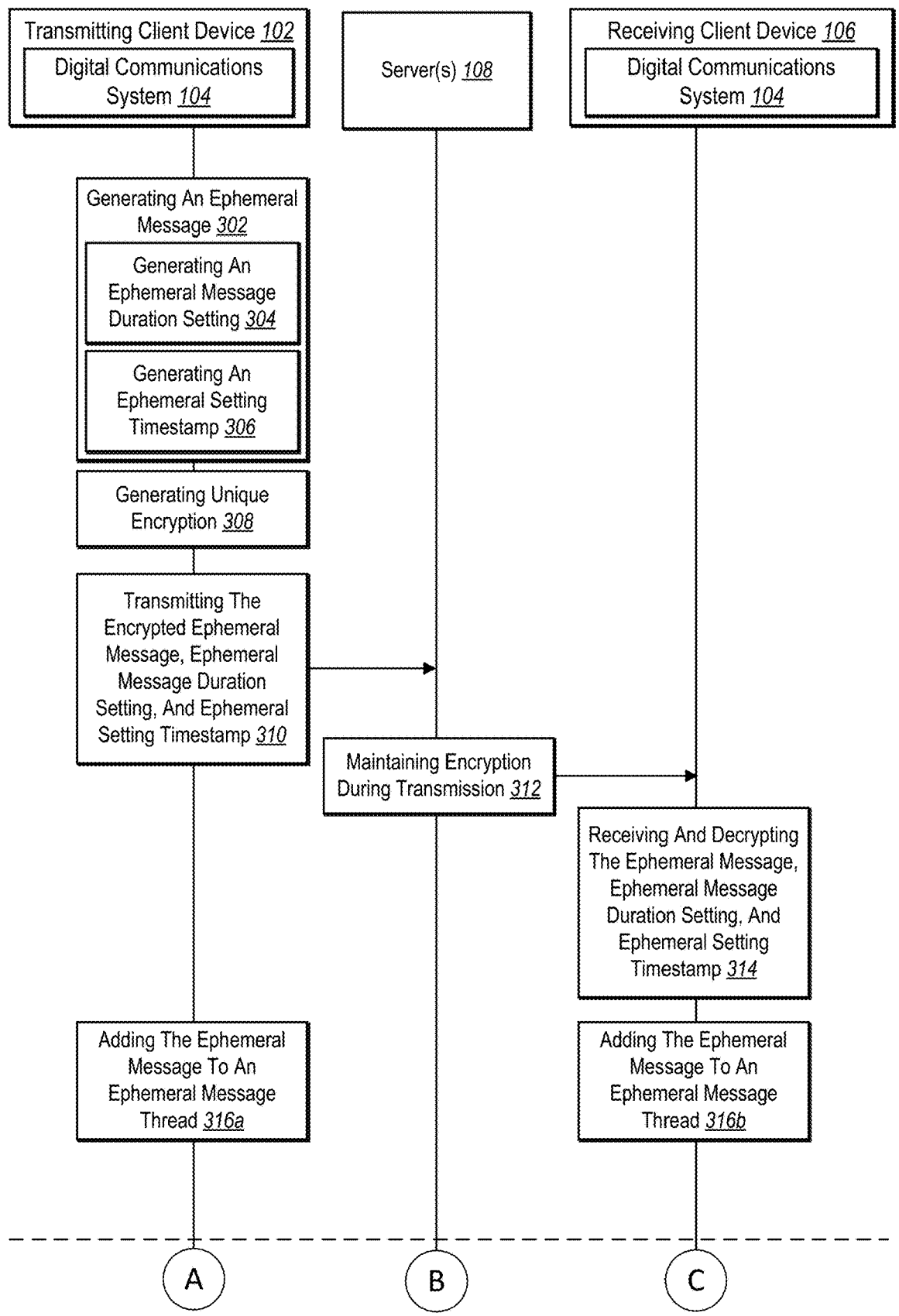
FIGS. 3A-3B illustrates a sequence flow diagram for generating, transmitting, and utilizing encrypted ephemeral messages to update ephemeral duration settings in accordance with one or more embodiments.
Figure 3B:
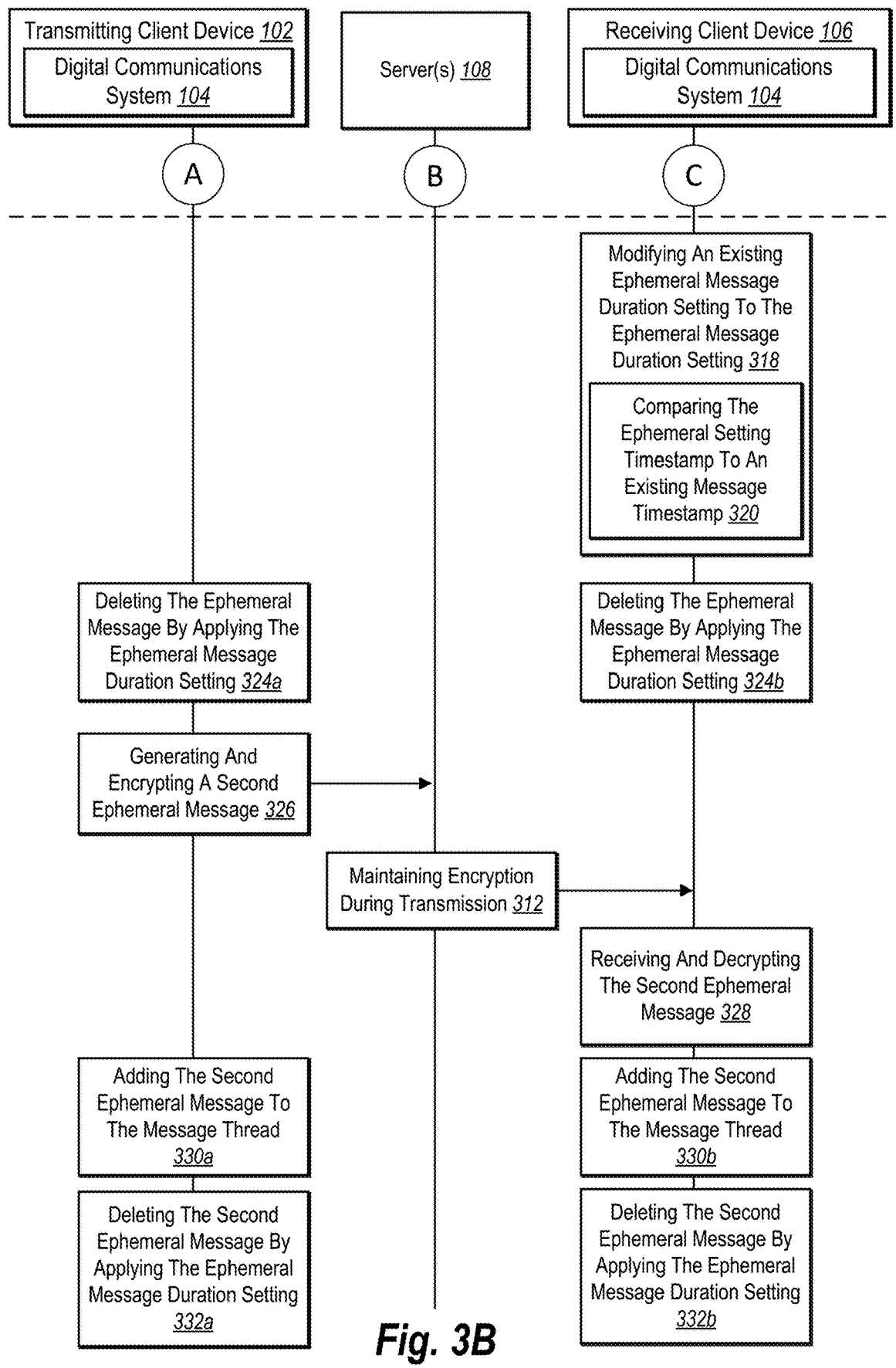

FIGS. 3A-3B includes a sequence flow diagram for generating, transmitting, and utilizing encrypted ephemeral messages to update ephemeral duration settings in accordance with one or more embodiments. More specifically, FIGS. 3A-3B illustrates that the digital communications system 104 utilizes the transmitting client device 102, the server(s) 108 and the receiving client device 106 to perform a variety of acts. For instance, FIG. 3A illustrates the digital communications system 104 utilizing the transmitting client device 102 to perform an act 302 of generating an ephemeral message. More specifically, the digital communications system 104 can receive user input (e.g. via a messaging graphical user interface) indicating content for an ephemeral message. For example, the digital communications system 104 can generate an ephemeral message to include received text, selected digital media, selected recipients, etc. Based on such received user input, the digital communications system 104 can identify a corresponding recipient device messaging thread.

Further, as shown in FIG. 3A, the act 302 can include an act 304 of generating (or identifying) an ephemeral message duration setting. More specifically, the digital communications system 104 can receive user input indicating a change to the ephemeral message duration setting. For example, the digital communications system 104 can receive user interaction (e.g. via a settings graphical user interface corresponding to the ephemeral message thread) selecting an updated ephemeral message duration setting. The digital communications system 104 can then generate the ephemeral message duration setting for the ephemeral message based on the updated ephemeral message duration setting.

In the alternative, the digital communications system 104 can determine that no change was made to an existing message duration setting. To illustrate, the digital communications system 104 can determine that the transmitting client device 102 did not detect any user input selecting an updated ephemeral message duration setting. In response to determining that no update was initiated, the digital communications system 104 can identify an existing message duration setting corresponding to the identified messaging thread. Then, the digital communications system 104 can utilize the existing message duration setting for the generated ephemeral message.

In addition to modifying ephemeral message duration settings from one ephemeral message duration setting to another ephemeral message duration setting, the digital communications system 104 can identify a modification from an ephemeral message duration setting to a persistent duration setting. That is, the digital communications system 104 can identify and implement a modification of an ephemeral message duration setting to a duration that will never expire. To illustrate, the digital communications system 104 can identify and implement this modification so that a previously ephemeral message thread is no longer ephemeral.

Similarly, the digital communications system 104 can modify a persistent messaging thread to an ephemeral messaging thread. More specifically, the digital communications system 104 can modify a persistent duration setting to an ephemeral message duration setting. To illustrate, the digital communications system 104 can identify and implement a modification of a persistent duration setting to an ephemeral message duration setting of one hour, one day, or one week. Moreover, the digital communications system 104 can apply the ephemeral message duration setting to future messages in the message thread.

Additionally, as shown in FIG. 3A, the act 302 can include an act 306 of generating an ephemeral setting timestamp. The digital communications system 104 can generate the ephemeral setting timestamp to include a time at which the corresponding ephemeral message duration setting was set. In one or more embodiments, the digital communications system 104 can generate the ephemeral message timestamp to include a time (e.g., one second) after the corresponding ephemeral message duration setting was set.

In one or more embodiments, the digital communications system 104 generates the ephemeral message duration setting and the ephemeral setting timestamp as part of the ephemeral message. For example, the digital communications system 104 can store the ephemeral message duration setting and the ephemeral setting timestamp as stanzas in the metadata of the ephemeral message. However, in some embodiments, the digital communications system 104 can store and transmit the ephemeral message duration setting and/or ephemeral setting timestamp in a data packet separately from the ephemeral message.

Additionally, in one or more embodiments, the digital communications system 104 can send an updated ephemeral message duration setting and corresponding ephemeral setting timestamp without the transmission of an ephemeral message. To illustrate, the digital communications system 104 can receive a modification to the ephemeral message duration setting of a messaging thread (e.g. via user interaction received via a settings graphical user interface corresponding to the messaging thread). The digital communications system 104 can generate an updated ephemeral message duration setting in accordance with the selected ephemeral message duration setting. Further, the digital communications system 104 can generate an ephemeral setting timestamp based on a time of generating the updated ephemeral message duration setting. Accordingly, the digital communications system 104 can transmit an updated ephemeral message duration setting without an accompanying ephemeral message.

Further, as shown in FIG. 3A, the transmitting client device 102 can perform an act 308 of generating a unique encryption. To illustrate, the digital communications system 104 can encrypt the ephemeral message, ephemeral message duration setting, and ephemeral setting timestamp generated at the acts 302-306. In one or more embodiments, the digital communications system 104 generates an end-to-end encryption of the ephemeral message, ephemeral message duration setting, and ephemeral setting timestamp. However, the digital communications system 104 can utilize a variety of encryption methods, including symmetric and asymmetric encryption.

Also, as shown in FIG. 3B, the transmitting client device 102 can perform an act 310 of transmitting the encrypted ephemeral message, ephemeral message duration setting, and ephemeral setting timestamp (e.g., as part of an encrypted digital communication transmitted as one or more data packets). The digital communications system 104 can transmit the ephemeral message, ephemeral message duration setting, and ephemeral setting timestamp via the server(s) 108. However, the digital communications system 104 can maintain the encryption during the transmission.

Accordingly, as shown in FIG. 3A, the server(s) 108 can perform an act 312 of maintaining encryption during transmission. To illustrate, the server(s) 108 can receive and transmit the ephemeral message, ephemeral message duration setting, and ephemeral setting timestamp to the receiving device 106 without any decryption. In some embodiments, cryptographic keys needed to decrypt the ephemeral message are not present on the server device(s) 108. Thus, no portion of the contents of the ephemeral message, ephemeral message duration setting, or ephemeral setting timestamp are available/accessible to the server(s) 108. The digital communications system 104 can accordingly protect the privacy of the content of the ephemeral message, ephemeral message duration setting, and ephemeral setting timestamp.

Additionally, the receiving client device 106 can perform an act 314 of receiving and decrypting the ephemeral message, ephemeral message duration setting, and ephemeral setting timestamp. In one or more embodiments, the digital communications system 104 decrypts the ephemeral message, ephemeral message duration setting, and ephemeral setting timestamp utilizing cryptographic keys stored on the receiving client device 104. However, the digital communications system 104 can utilize a variety of decryption methods corresponding to the variety of encryption methods utilized to encrypt the ephemeral message.

The transmitting client device 102 and the receiving client device 106 can also perform an act 316a-316b, respectively, of adding the ephemeral message to an ephemeral message thread. The transmitting client device 102 can add the ephemeral message to an ephemeral message thread upon transmission of the ephemeral message. The receiving client device 106 can add the ephemeral message to the ephemeral message thread upon receipt and decryption of the ephemeral message.

Further, the receiving client device 106 can perform an act 318 of modifying an existing ephemeral message duration setting to the ephemeral message duration setting. As also shown in FIG. 3B, the act 318 can include an act 320 of comparing the ephemeral setting timestamp to the existing message timestamp. To illustrate, upon receipt and decryption of the ephemeral message, ephemeral message duration setting, and ephemeral setting timestamp, the digital communications system 104 can identify the ephemeral setting timestamp. Further, the digital communications system 104 can identify an existing setting timestamp corresponding to an existing duration setting stored on the recipient client device 106 for the ephemeral message thread.

The digital communications system 104 can determine whether to update an existing message duration setting based on comparison of timestamps. In one or more embodiments, if the digital communications system 104 determines that the ephemeral setting timestamp predates the existing setting timestamp (i.e. that the existing setting timestamp is more recent), the digital communications system 104 takes no action to modify the existing message duration setting. In addition, in some embodiments, the digital communications system 104 can transmit the existing setting timestamp and existing message duration setting to the transmitting client device 102. For example, the digital communications system 104 can generate and transmit an updated ephemeral message duration setting data packet to the transmitting client device 102. Based on receiving the existing setting timestamp and existing message duration setting, the transmitting client device can perform a comparison and modify its ephemeral message duration setting.

However, based on determining that the existing setting timestamp for the ephemeral messaging thread predates the ephemeral message duration setting from the most recent ephemeral message (i.e. that the ephemeral message duration setting from the ephemeral message is more recent), the digital communications system 104 modifies the existing message duration setting from the ephemeral message thread. Indeed, the digital communication system 104 can modify the message duration setting for the ephemeral message thread to match the ephemeral message duration setting included with the most recent ephemeral message.

That is, in one or more embodiments, the digital communications system 104 utilizes the ephemeral message duration setting for the ephemeral messaging thread. As mentioned above, the digital communications system 104 can modify the ephemeral message duration setting for one ephemeral messaging thread without modifying other messaging threads.

In some embodiments, the digital communications system 104 can also apply a set of permissible ephemeral setting durations (and correspondingly, a set of impermissible ephemeral setting durations) in determining whether to update the message thread settings. The digital communication system 104 can compare an ephemeral message duration setting from an ephemeral message with the permissible ephemeral setting durations prior to modifying settings for a message thread. For example, a third-party may seek to send inappropriate content with a two second ephemeral message duration setting (which would make it difficult for a recipient to review and report the inappropriate content). The digital communication system 104 can determine that the two second ephemeral message duration setting is not a permissible ephemeral setting duration. In response, the digital communication system 1104 can apply the existing ephemeral setting duration for the message thread to the received ephemeral message (e.g., apply an existing thirty second duration associated with the message thread rather than the two second duration associated with the newly received ephemeral message). In other embodiments, the digital communication system 1104 respects and applies the duration setting attached to each ephemeral message.

Additionally, in one or more embodiments, the digital communications system 104 determines that the existing setting timestamp is equal to a timestamp corresponding to the ephemeral message duration setting (i.e. that the settings were set at the same time). In such circumstances, the digital communication system 104 can utilize a client device order to determine whether to update the existing settings. For example, in some embodiments, based on identifying matching timestamps, the digital communications system 104 utilizes a unique identifier corresponding to the transmitting client device 102 and/or the receiving client device 106. More specifically, the digital communications system 104 can determine which unique identifier is first in an alphabetical order. Thus, the digital communications system 104 can treat the timestamp corresponding to the unique identifier that is first in alphabetical order as the more recent timestamp.

In one or more embodiments, the digital communications system 104 preserves system resources by limiting comparison of timestamps for modification of ephemeral message duration setting. In some embodiments, the digital communications system 104 implements a timed limitation such that, after modifying an ephemeral message duration setting, the digital communications system 104 will not initiate comparison for a predetermined amount of time (e.g. 1 minute, 3 minutes, 15 minutes, etc.). Moreover, in some embodiments, the digital communications system 104 can also preserve system resources by only comparing timestamps if the encrypted digital communication includes an ephemeral message.

Further, as FIGS. 3A-3B illustrate, the digital communications system 104 modifies existing setting timestamps in response to receiving an ephemeral message duration setting. However, the digital communications system 104 can also utilize timestamps to determine an ephemeral message duration setting based on determining that the receiving client device 106 (or the transmitting client device 102) is out of sync. The digital communications system 104 can determine that a client device is out of sync based on a re-installation of a digital communication application. Additionally, in some embodiments, the digital communications system 104 determines that a client device is out of sync based on a corruption of data.

In response to determining that the client device is out of sync, the digital communications system 104 can generate an ephemeral synchronization request to client devices corresponding to the ephemeral messaging thread. To illustrate, the requesting client device 104 can generate and transmit an ephemeral synchronization request that requests the transmitting client device 102 to provide its currently stored existing message duration setting and corresponding existing setting timestamp for the messaging thread. Upon receiving the ephemeral synchronization request, the transmitting client device can generate and transmit its currently stored existing message duration setting and corresponding existing setting timestamp for the messaging thread. Further, upon receiving the existing message duration setting and corresponding existing setting timestamp for the messaging thread, the receiving client device 106 can utilize the existing message duration setting for the messaging thread.

Additionally, the transmitting client device 102 and the receiving client device 106 can also perform an act 324*a*-324*b*, respectively, of deleting the ephemeral message by applying the ephemeral message duration setting. In some embodiments, the digital communications system 104 automatically removes the ephemeral message from the messaging thread upon an expiration time. That is, the digital communications system 104 determines an expiration time for the ephemeral message based on the ephemeral message duration setting and a triggering event. To illustrate, the digital communications system 104 can add the ephemeral message duration setting to a timestamp of a triggering event (e.g., when the ephemeral message is viewed). For example, an ephemeral message viewed at 1:00 pm with an ephemeral message duration setting of 2 hours will have an expiration time of 3:00 pm. Thus, the digital communications system 104 automatically deletes the ephemeral message at 3:00 pm.

The digital communication system 104 can delete an ephemeral message in a variety of ways. In some embodiments, for example, the digital communication system 104 deletes an ephemeral message by hiding the ephemeral message from a client device (e.g., removing viewing privileges for the ephemeral message). The digital communication system 104 can also delete an ephemeral message by removing the ephemeral message from storage or memory (e.g., on the client device or a server). In some embodiments, the digital communication system 140 deletes an ephemeral message by first hiding the message and then removing the ephemeral message at a later time (e.g., in response to a later triggering event, such as navigating away from the conversation).

In addition or in the alternative, the digital communications system 104 can apply the ephemeral message duration setting to delete the ephemeral message in response to a triggering event. To illustrate, in one or more embodiments, the digital communications system 104 can apply an ephemeral message duration setting based on detecting a triggering event. For example, the system can measure the ephemeral message duration setting from the time that a client device first accesses (or detects user interaction with) the ephemeral message. Thus, if a receiving client device accesses the ephemeral message and the duration is two hours, the system can delete the ephemeral message two hours after the receiving device accesses (or detects user interaction with) the ephemeral message. In addition or in the alternative, the digital communications system 104 can measure the ephemeral message duration setting from a time that a client device first opens the digital communications application after receiving an ephemeral message, from a time that a client device responds in a messaging thread to an ephemeral message, from a time that a client device opens a messaging thread, etc.

Accordingly, the digital communications system 104 can determine whether the ephemeral message has expired. In the above example where an ephemeral message has an expiration time of 3:00 pm, the digital communications system 104 receives a request to view the ephemeral message at 3:30 pm. In some embodiments, the digital communications system 104 determines that the ephemeral message has expired at the current time, and thus deletes the ephemeral message in response to the request to view the ephemeral message.

In addition or in the alternative, the digital communications system 104 removes the ephemeral message from the ephemeral messaging thread in response to the request to view the ephemeral message. In these embodiments, the digital communications system 104 deletes the ephemeral message at a different time and/or in response to an additional triggering event. For example, in one or more embodiments, the digital communications system 104 deletes the ephemeral message in response to receiving user input navigating away from the ephemeral messaging thread.

Further, as shown in FIG. 3B, the transmitting client device can perform an act 326 of generating and encrypting a second ephemeral message. As discussed above with regard to acts 302-310, the digital communications system 104 can generate an ephemeral message in accordance with a variety of user input. Further, as discussed above, the server(s) 108 can perform an act 312 of maintaining encryption during transmission. Additionally, the receiving client device 106 can perform an act 328 of receiving and decrypting the second ephemeral message. Further, the transmitting client device 102 and the receiving client device 106 can also perform an act 330a-330b, respectively, of adding the second ephemeral message to the message thread. Similar to the acts 316a-316b discussed above, the digital communications system 104 can add the ephemeral message based on transmitting and/or receiving the ephemeral message.

The transmitting client device 102 and the receiving client device 106 can also perform an act 332a-332b, respectively, of deleting the second ephemeral message by applying the ephemeral message duration setting. In this example, the second ephemeral message does not include an updated ephemeral message duration setting. Accordingly, the digital communications system 104 applies the ephemeral message duration setting modified at the act 318 to the second ephemeral message. Thus, the ephemeral message duration setting applies to subsequent messages in the ephemeral messaging thread as a whole.

However, in one or more embodiments, the digital communications system 104 applies an existing message duration setting to one or more existing ephemeral messages in an ephemeral message thread. To illustrate, the digital communications system 104 can apply the ephemeral message duration setting to the ephemeral message and all subsequent ephemeral messages in the ephemeral message thread, but not to existing ephemeral messages. For example, the ephemeral communication system 116 can apply the ephemeral message duration setting to the second ephemeral message at act 318. However, the digital communications system 104 can instead apply the existing ephemeral message duration setting to existing ephemeral messages in the messaging thread. In some embodiments, the digital communications system 104 declines to delete messages in the messaging thread with a perpetual (e.g. not ephemeral) duration setting.

Figure 4:
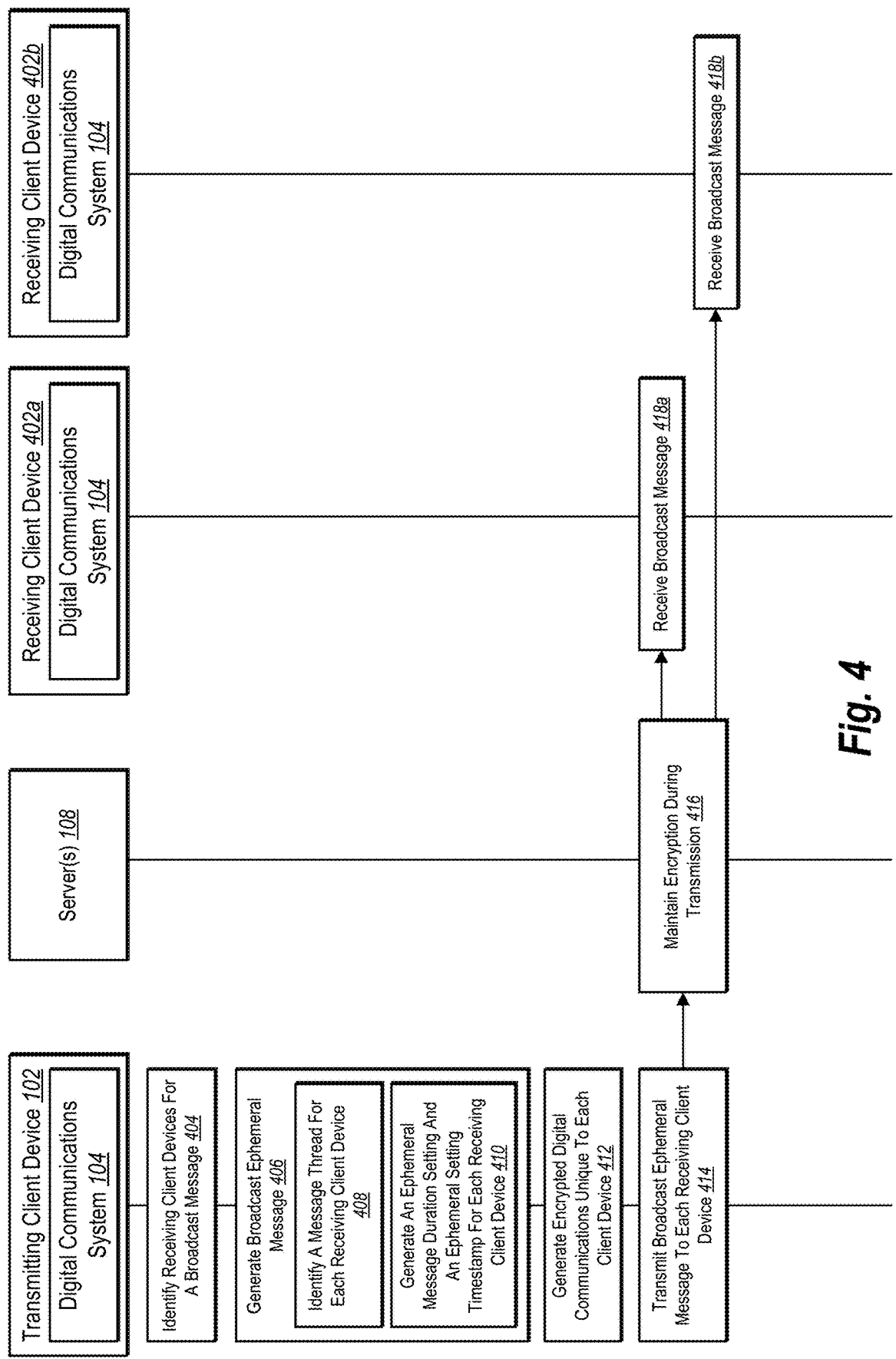
FIG. 4 illustrates a sequence flow diagram for generating a broadcast message for a plurality of ephemeral message threads in accordance with one or more embodiments.

Turning to FIG. 4, as discussed above, the digital communications system 104 can generate, transmit, and receive broadcast ephemeral messages. In particular, the digital communications system 104 can generate and submit multiple messages to multiple ephemeral message threads based on a message generated via a single messaging graphical user interface. FIG. 4 illustrates a variety of acts performed by the digital communications system 104 utilizing the transmitting client device 102, the server(s) 108, a receiving client device 402a, and a receiving client device 402b in dynamically controlling broadcast ephemeral messages.

As shown in FIG. 4, the transmitting client device 102 can perform an act 404 of identifying receiving client devices from a broadcast message. As will be discussed below with regard to FIGS. 6A-6C, the digital communications system 104 can receive user input selecting receiving client devices at a messaging graphical user interface. In FIG. 4, the digital communications system 104 receives user input selecting the receiving client device 402a and the receiving client device 402b to receive the broadcast ephemeral message.

Further, the transmitting client device 102 can perform an act 406 of generating a broadcast ephemeral message. The digital communications system 104 can generate the body of the broadcast ephemeral message based on received user input at a messaging graphical user interface. As will be discussed in greater detail below with regard to FIGS. 6A-6C, the digital communications system 104 can receive and utilize a variety of types of user input to generate the body of the broadcast ephemeral message.

As shown in FIG. 4, the act 406 includes an act 408 of identifying a message thread for each receiving client device. For the broadcast ephemeral message, the digital communications system 104 identifies multiple messaging threads to receive the broadcast ephemeral message. As mentioned, the digital communications system 104 identifies message threads to receive the broadcast ephemeral message based on user input selecting message threads and/or receiving client devices. For example, in FIG. 4, the digital communications system 104 receives user input selecting messaging threads corresponding to the receiving client device 402a and the receiving client device 402b to receive the broadcast ephemeral message.

Though FIG. 4 illustrates transmission of the broadcast ephemeral message to two receiving client devices, the digital communications system 104 can transmit the broadcast ephemeral message to any number of receiving client devices. Additionally, digital communications system 104 can provide the broadcast ephemeral message to both group ephemeral messaging threads (e.g. ephemeral messaging threads including three or more client devices) and individual messaging threads (e.g. ephemeral messaging threads including two client devices). However, in one or more embodiments, the broadcast ephemeral message is not the same as a group ephemeral messaging thread. Instead, as mentioned above, the digital communications system 104 transmits a broadcast ephemeral message to multiple messaging threads.

Additionally, the act 406 can include an act 410 of generating an ephemeral message duration setting and an ephemeral setting timestamp for each receiving client device. Similar to discussion above with regard to FIGS. 3A-3B, the digital communications system 104 can generate an ephemeral setting timestamp based on the time of generating/modifying an ephemeral message duration setting corresponding to each ephemeral message thread.

In some embodiments, the digital communications system 104 generates an ephemeral message duration setting for each receiving client device based on a received updated ephemeral message duration setting. That is, the digital communications system 104 can provide an updated ephemeral message duration setting to multiple messaging threads via a broadcast ephemeral message. More specifically, the digital communications system 104 can update an ephemeral message duration setting for one or more messaging threads based on selection of an ephemeral message duration setting.

The digital communications system 104 can also determine that the broadcast ephemeral message does not include an updated ephemeral message duration setting. Based on this determination, the digital communications system 104 can generate an ephemeral message duration setting for each receiving device based on the existing ephemeral message duration setting of the ephemeral messaging thread corresponding to that receiving client device. Thus, the digital communications system 104 can provide ephemeral messages to a variety of messaging threads with differing ephemeral message duration settings via a single broadcast ephemeral message.

For example, in FIG. 4, the receiving client device 402a corresponds to an ephemeral messaging thread with an ephemeral message duration setting of 24 hours, and the receiving client device 402b corresponds to a messaging thread with an ephemeral message duration setting of one hour. Accordingly, the digital communications system 104 can generate an ephemeral message duration setting of 24 hours for the receiving client device 402a. Further, the digital communications system 104 can generate an ephemeral message duration setting of one hour for the receiving client device 402b.

Also, the transmitting client device 102 can perform an act 412 of generating a unique encryption (e.g., a unique encrypted digital communication) for each receiving client device. As discussed above, the digital communications system 104 can utilize a variety of encryption techniques. In some embodiments, the digital communications system 104 generates a unique encrypted digital communication for each instance of the broadcast ephemeral message transmitted to each receiving client device. To illustrate, a unique encrypted digital communication includes an encrypted broadcast ephemeral message, an encrypted ephemeral message duration setting (specific to each message thread), and an encrypted ephemeral setting timestamp. As mentioned, the digital communications system 104 can generate an ephemeral message duration setting and ephemeral setting timestamp for each receiving device. The digital communications system 104 can generate the unique encrypted digital communication for each receiving client device including the corresponding ephemeral message duration setting and ephemeral setting timestamp.

The transmitting client device 102 can further perform an act 414 of transmitting the broadcast ephemeral message to each receiving client device. As discussed above, the digital communications system 104 can transmit the ephemeral message, different ephemeral message duration settings, and ephemeral setting timestamps together or in separate data packets. Thus, the digital communication system 104 can transmit a first encrypted digital communication by sending a first encrypted data packet (including an ephemeral message) to the receiving client device 402a and a second encrypted data packet (including a first ephemeral message duration setting) to the receiving client device 402a. Similarly, the digital communication system can transmit a second encrypted digital communication by sending a third encrypted data packet (including the ephemeral message) to the receiving client device 402b and sending a fourth encrypted data packet (including second ephemeral message duration setting). Thus, in some embodiments, the encrypted digital communications include an updated ephemeral message duration setting for each receiving client device. In addition or in the alternative, the digital communications system 104 can generate the encrypted digital communications including different ephemeral message duration settings and/or different ephemeral setting timestamps.

Additionally, the server(s) 108 can perform an act 416 of maintaining encryption during transmission. Similar to discussion with regard to FIGS. 3A-3B, the server(s) 108 can transmit the broadcast ephemeral message without any decryption of the message on the server(s) 108. As also shown in FIG. 4, the receiving client device 402a and the receiving client device 402b can perform an act 418a-418b, respectively, of receiving the broadcast ephemeral message. More specifically, the receiving client device 402a receives a first unique encrypted digital communication (including the broadcast ephemeral message, a first ephemeral message duration setting, and a first timestamp) and the receiving client device 402b receives a second unique encrypted digital communication (including the broadcast ephemeral message, a second ephemeral message duration setting, and a second timestamp).

Upon receiving the broadcast ephemeral message, the receiving client device 402a and the receiving client device 402b can add the broadcast ephemeral message to their respective ephemeral messaging threads. Further, similar to discussion above with regard to FIGS. 3A-3B, the receiving client device 402a and the receiving client device 402b can modify an existing ephemeral message duration setting based on comparing digital timestamps. Further, the receiving client device 402a and the receiving client device 402b can apply ephemeral message duration settings to delete ephemeral messages from their respective ephemeral messaging threads. Specifically, the client device 402a can apply the first ephemeral message duration setting and the second client device 402b can apply the second ephemeral message duration setting.

Though FIG. 4 illustrates a broadcast ephemeral message including transmission to ephemeral messaging threads, the digital communications system 104 can generate a broadcast message including some, but not all, ephemeral messaging threads. For example, take a first receiving client device corresponding to an ephemeral messaging thread with an ephemeral message duration setting of 24 hours, and a second receiving client device corresponding to a messaging thread with a perpetual message duration setting. That is, in this example, the second receiving client device corresponds to a messaging thread that is not ephemeral. Accordingly, the digital communications system 104 can generate an ephemeral message duration setting of 24 hours for the receiving client device 402a. Further, the digital communications system 104 can generate a perpetual message duration setting for the receiving client device 402b.

Figure 5B:
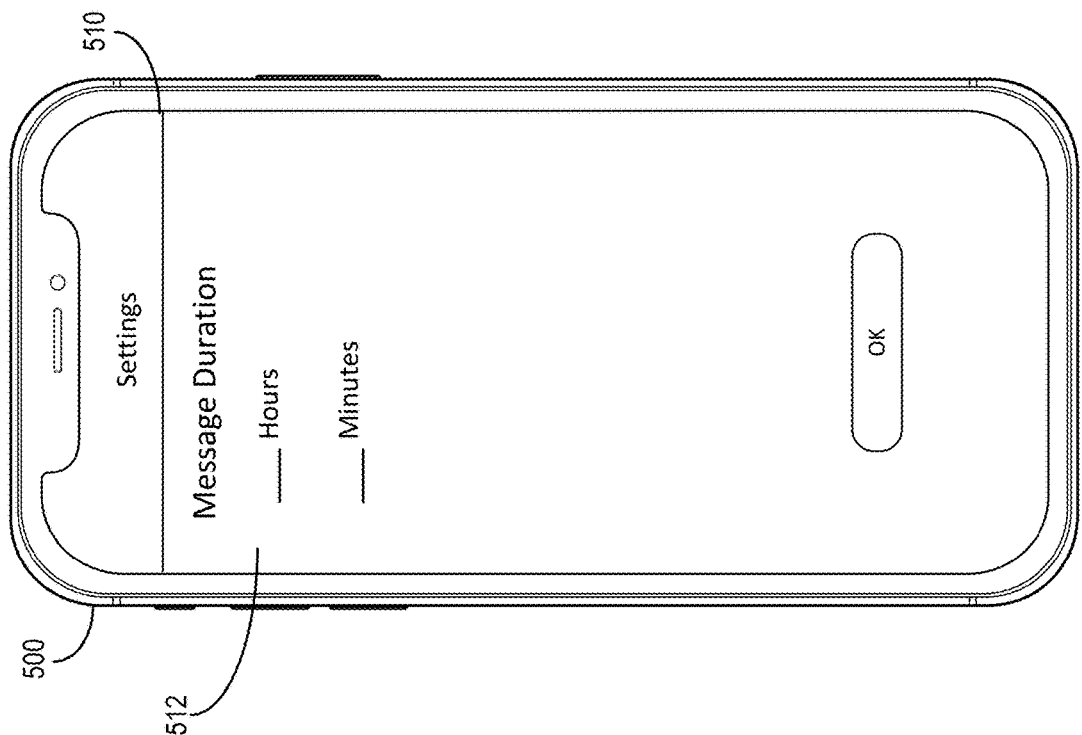
FIGS. 5A-5D illustrate example ephemeral message graphical user interfaces in accordance with one or more embodiments.
Figure 5A:
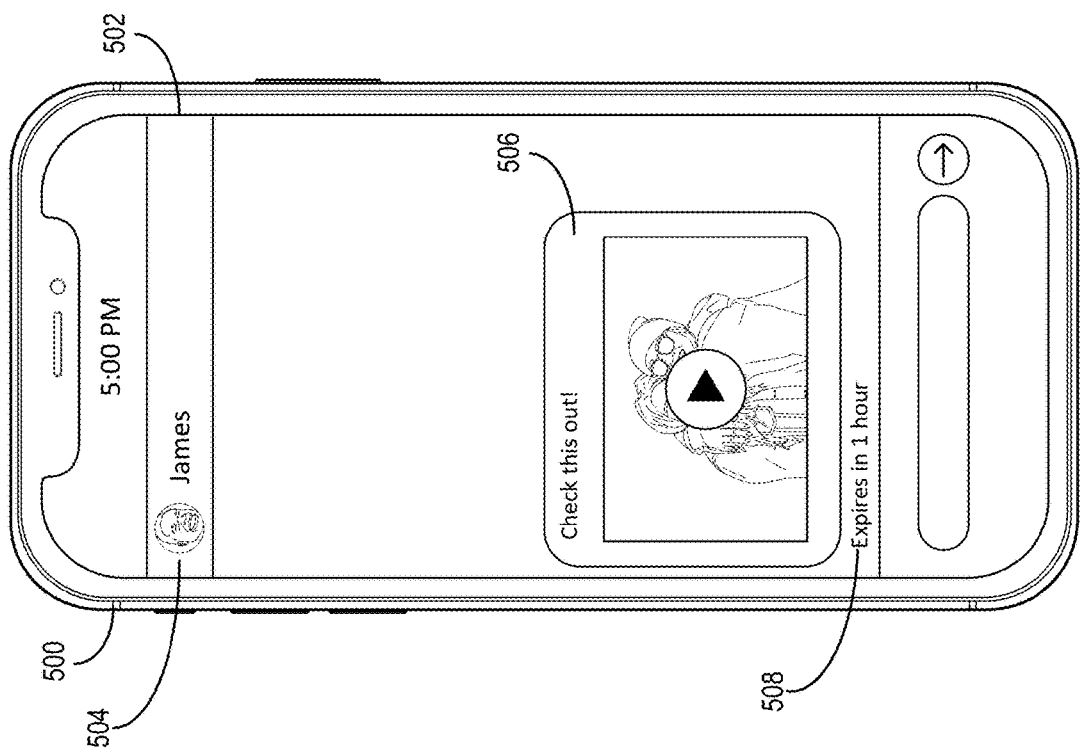

As discussed above, the digital communication system 104 can provide a variety of user interfaces for generating and receiving ephemeral messages. FIGS. 5A-5C illustrate an example set of graphical user interfaces for receiving an ephemeral message, generating and presenting a notification of an updated ephemeral message duration setting, and deleting an ephemeral message from an ephemeral message thread. More specifically, FIGS. 5A-5C illustrate a receiving client device 500 presenting an ephemeral message graphical user interface 502. The digital communications system 104 dynamically modifies the ephemeral message graphical user interface 502 based on updated ephemeral message duration settings and expiration of ephemeral messages.

FIGS. 5A-5C illustrate that the ephemeral message graphical user interface 502 includes the ephemeral message thread heading 504. In FIG. 5A, the ephemeral message graphical user interface 502 indicates the ephemeral message thread includes digital communications with an account corresponding to "James" (and his corresponding client devices). However, the digital communications system 104 can generate the ephemeral message graphical user interface 502 to include a variety of additional user accounts (and corresponding client devices). More specifically, the digital communications system 104 can identify a user account corresponding to the ephemeral message thread and can provide a variety of user information corresponding to the identified user account.

As shown in FIG. 5A, the receiving client device 500 receives the ephemeral message 506 at 5:00 pm. As also shown in FIG. 5A, the ephemeral message 506 includes a digital video and the text "Check this out!" However, the digital communications system 104 can generate a variety of ephemeral messages based on a variety of user inputs. Further, the digital communications system 104 can transmit a variety of ephemeral messages based on receiving user input (e.g. at a transmitting client device) submitting a drafted ephemeral message for transmission.

As further shown in FIG. 5A, the digital communications system 104 can generate the ephemeral message graphical user interface 502 to include an ephemeral message duration indicator 508. In FIG. 5A, the ephemeral message duration indicator 508 reads "Expires in 1 hour." However, the digital communications system 104 can generate the ephemeral message duration indicator 508 in accordance with a variety of times and duration settings. More specifically, the digital communications system 104 can identify an ephemeral message duration setting. Then, the digital communications system 104 can utilize a current time relative to a triggering event (e.g., transmission of the digital message relative to the ephemeral message duration setting) and the ephemeral message duration setting to determine an amount of time remaining before expiration of the ephemeral message.

For example, in FIG. 5A, the digital communications system 104 identifies a 1 hour ephemeral message duration setting and an ephemeral message time of transmission of 5:00 pm. Because it is still 5:00 pm, the digital communications system 104 determines that the ephemeral message expires in 1 hour (i.e. 1 hour-0 hours=1 hour). The digital communications system 104 can further generate the ephemeral message duration indicator 508 accordingly. Further, as discussed above, the digital communications system 104 can utilize a variety of triggering events to determine a remaining time for the ephemeral message duration indicator 508. For example, the digital communications system 104 can utilize a time at which the receiving client device 500 first accesses the ephemeral message 506 and/or the corresponding ephemeral messaging thread.

Further, the digital communications system 104 can generate the ephemeral message duration indicator 508 in a variety of formats. In some embodiments, the ephemeral message duration indicator 508 further includes a timestamp corresponding to the ephemeral message. For example, instead of reading "Expires in 1 hour," the ephemeral message duration indicator 508 can read "Expires at 6:00 pm" or "Received at 5:00 pm, expires at 6:00 pm."

Additionally, as shown in FIG. 5B, the digital communications system 104 can provide a settings graphical user interface 510 corresponding to the messaging thread. More specifically, the digital communications system 104 can generate the settings graphical user interface 510 to include an ephemeral message duration setting selection area 512. As shown in FIG. 5B, the ephemeral message duration setting selection area 512 includes fillable fields for a number of hours and/or minutes for the ephemeral message duration setting. However, the digital communications system 104 can generate the ephemeral message duration setting selection area 512 in a variety of formats to receive a variety of types of user input. For example, the ephemeral message duration setting selection area 512 can include a sliding graphical user interface element, a drop-down menu, a single fillable field, and a variety of other graphical user interface element types. Additionally, though FIG. 5B illustrates a settings graphical user interface 510 corresponding on the receiving device 500, it will be appreciated that the digital communications system 104 can provide the settings graphical user interface 510 on a transmitting client device (e.g. during message generation).

As shown in FIG. 5C, in response to modifying an ephemeral message duration setting for an ephemeral messaging thread at the transmitting client device, the digital communications system 104 can generate an updated setting notification 514. In some embodiments, the digital communications system 104 generates the updated setting notification 514 via the receiving client device 500. In one or more alternate embodiments, the digital communications system 104 generates the updated setting notification 514 via a transmitting client device (e.g. that generated and transmitted the corresponding ephemeral message).

As shown in FIG. 5C, the digital communications system 104 provides the updated setting notification 514 for presentation as part of the ephemeral message graphical user interface 502. In one or more embodiments, the digital communications system 104 can provide the updated setting notification 514 for presentation as an overlay. However, it will be appreciated that the digital communications system 104 can generate the updated setting notification 514 in accordance with a variety of notification types.

In FIG. 5C, the updated setting notification 514 includes the text "James has changed message expiration to one hour." However, the digital communications system 104 can generate the updated setting notification 514 in accordance with a variety of updated ephemeral message duration settings. To illustrate, in one or more embodiments, the digital communications system 104 can determine the updated ephemeral message duration setting and can include the updated ephemeral message duration setting in the updated setting notification 514.

The updated setting notification 514 also includes an accept button and a decline button. In FIG. 5C, the accept button includes the text "Okay." However, it will be appreciated that the digital communications system 104 can generate the accept button in accordance with a variety of text communicating acceptance of the modification (e.g. "OK," "Accept," "Alright," etc.). Based on receiving an indication of user input at the accept button, the digital communications system 104 can dismiss the updated setting notification 514.

Further, the updated setting notification 514 can include a decline button. In FIG. 5C, the decline button includes the text "Decline." However, it will be appreciated that the digital communications system 104 can generate the decline button in accordance with a variety of text communicating rejection of the modification (e.g. "No Thanks," "Reject," "Deny," etc.). Based on receiving an indication of user input at the decline button, the digital communications system 104 can decline to modify an existing ephemeral message duration setting. Further, the digital communications system 104 can generate and transmit a notification of the rejection to the transmitting client device. In some embodiments, based on receiving a selection of the decline button, the digital communications system 104 applies the ephemeral message duration setting to the message 506 but not to existing messages in the messaging thread and not to future messages included in the messaging thread.

Figure 5D:
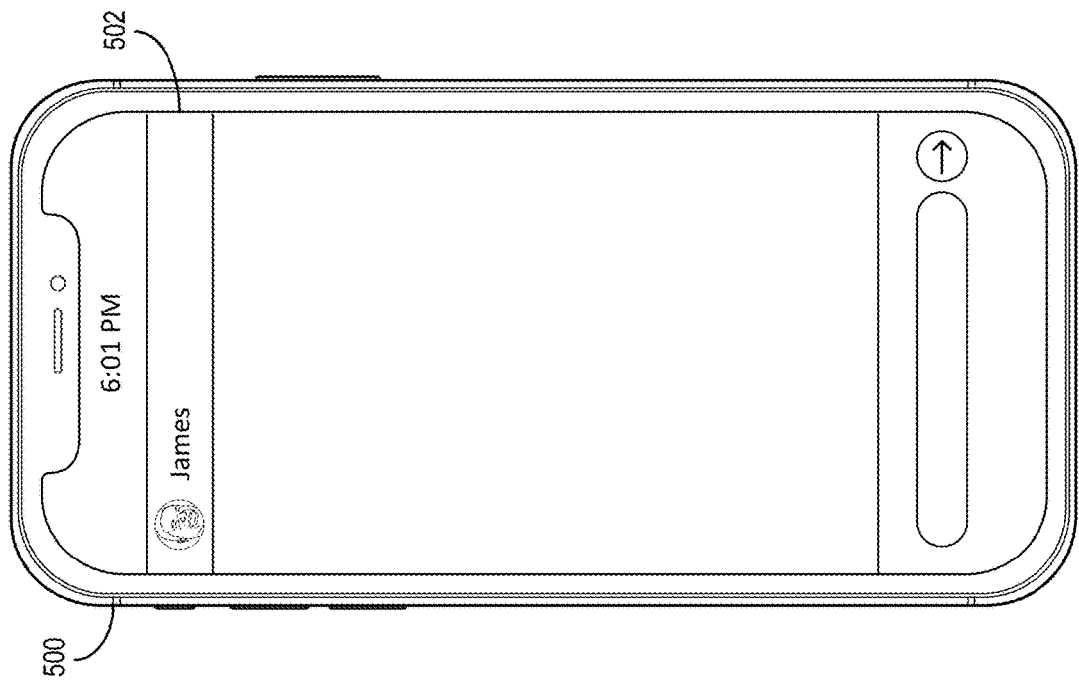
Figure 5C:
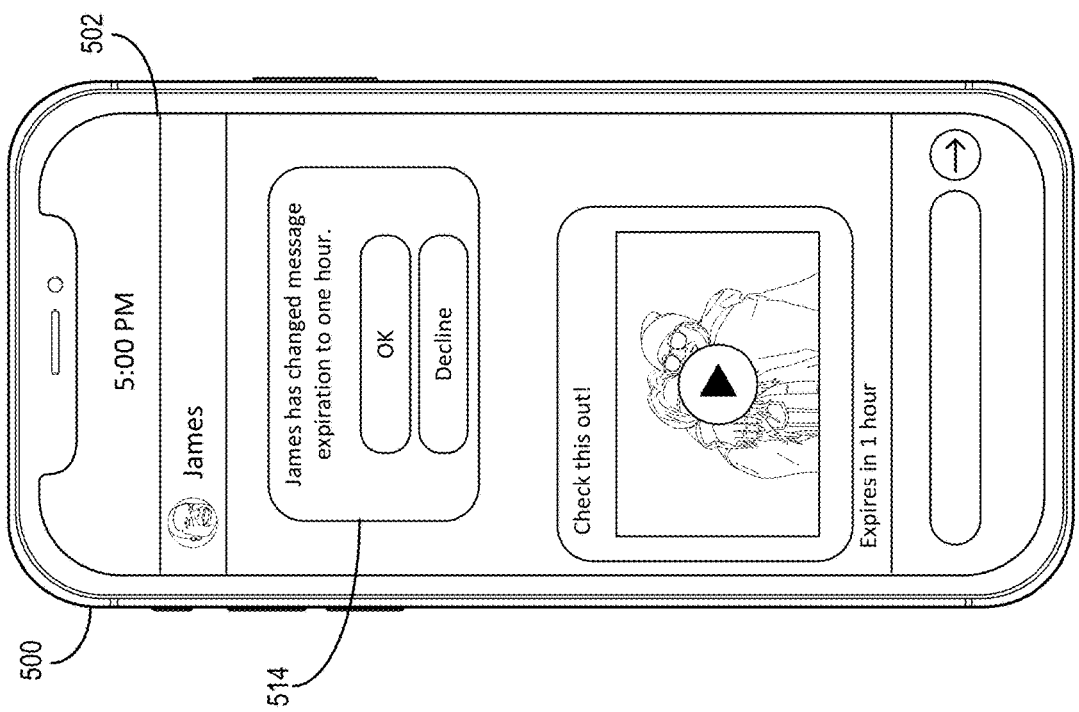

Additionally, as illustrated in FIG. 5D, the digital communications system 104 can apply the ephemeral message duration setting to delete ephemeral messages from the ephemeral messaging graphical user interface 502. As shown in FIG. 5C, the digital communications system 104 deletes the ephemeral message 506 at 6:01 pm. That is, the digital communications system 104 deletes the ephemeral message 506 after the one hour has elapsed, in accordance with the one hour ephemeral message duration setting. However, as discussed in greater detail above with regard to FIGS. 3A-3B, the digital communications system 104 can apply a variety of ephemeral message duration settings (and a variety of triggering events) to delete ephemeral messages.

As discussed above, the digital communication system 104 can also provide one or more user interfaces for generating and transmitting broadcast ephemeral messages. For example, FIGS. 6A-6C illustrate the digital communications system 104 generating and transmitting a broadcast ephemeral message based on user interaction with a single messaging graphical user interface.

Figure 6A:
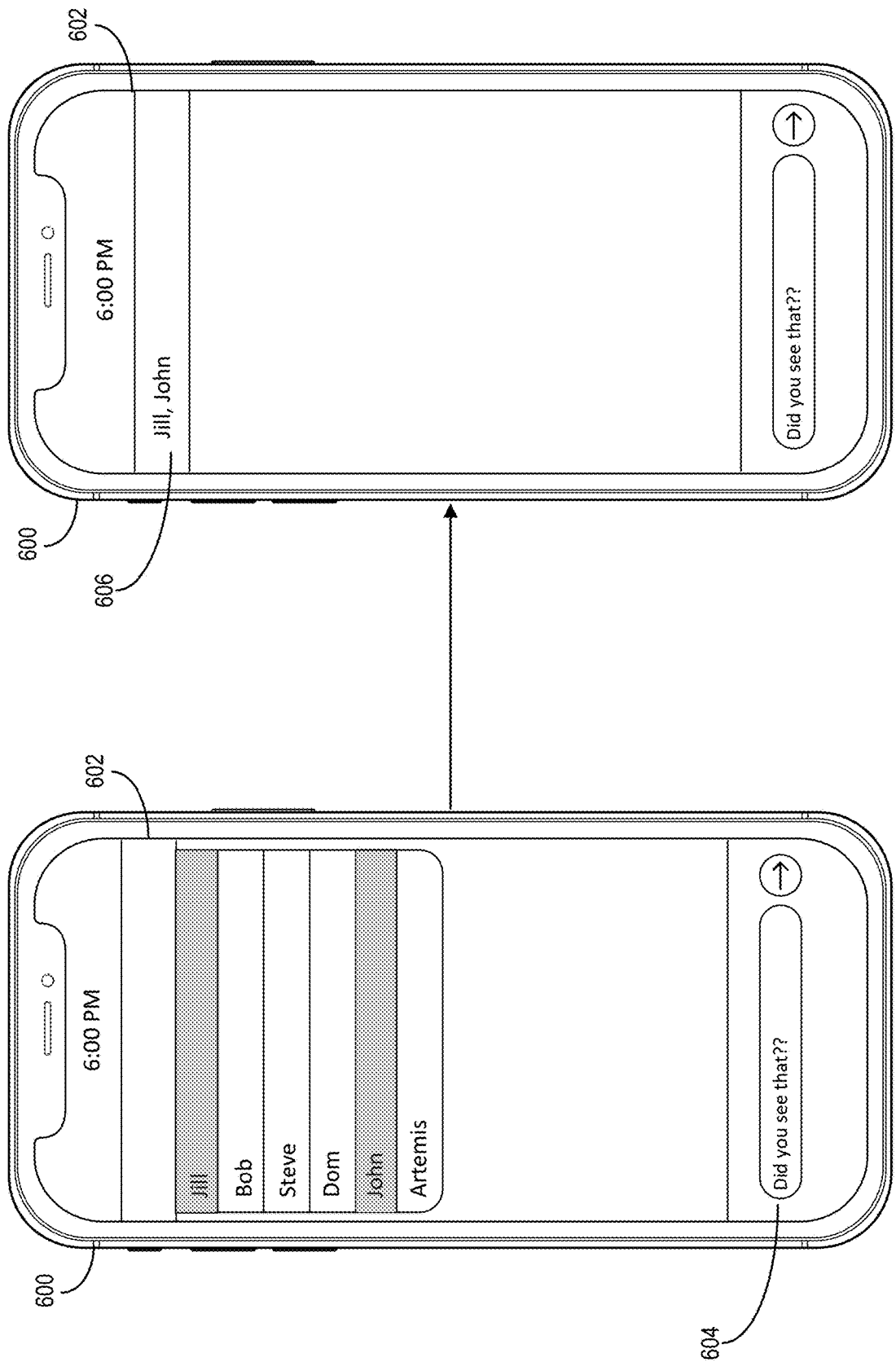
FIGS. 6A-6C illustrate example broadcast ephemeral message graphical user interfaces in accordance with one or more embodiments.
Figure 6C:
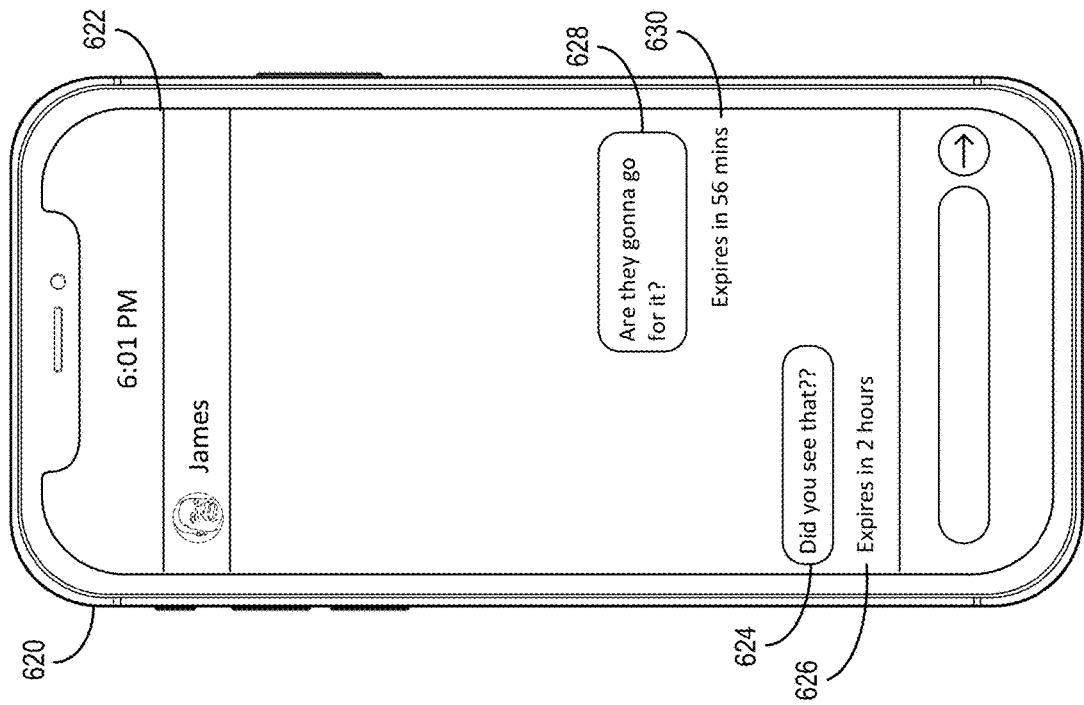
Figure 6B:
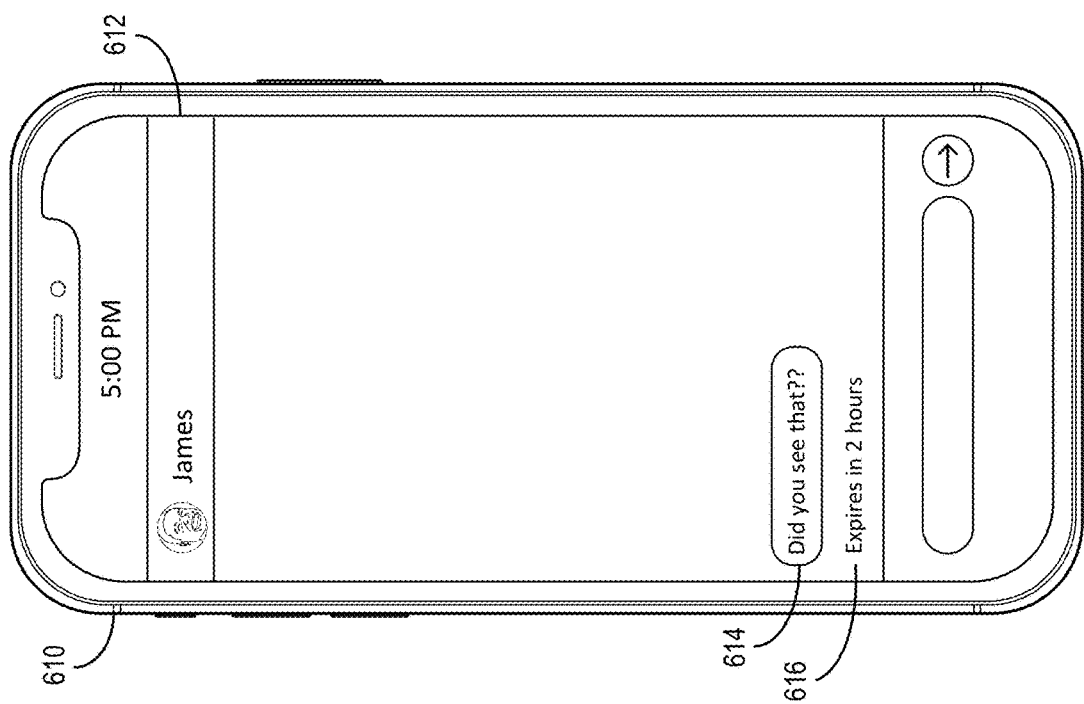

In particular, FIG. 6A illustrates a transmitting client device 600 presenting a messaging graphical user interface 602. The messaging graphical user interface 602 includes a message input area 604. As shown in FIG. 6A, the receiving client device 600 has received message input at the message input area 604 indicating the text "Did you see that?!" However, the digital communications system 104 can receive a variety of user inputs designating a variety of content for ephemeral messages. For example, the message input area 604 can receive user input selecting various forms of multimedia for inclusion in an ephemeral message.

Further, as shown in FIG. 6A, the messaging graphical user interface 602 further includes a recipient designation area 606. In response to receiving user input at the recipient designation area 606, the digital communications system 104 can identify multiple recipient client devices (and messaging threads) to receive a message. Indeed, the digital communication system 104 can identify some ephemeral messaging threads and some persistent message threads for distributing a particular digital message. For example, as shown in FIG. 6A, the recipient designation area 606 includes a drop-down menu including selectable elements corresponding to user identifiers and corresponding receiving client devices. In response to receiving user input selecting multiple client devices (e.g., multiple accounts corresponding to multiple messaging threads) to receive the message, the digital communications system 104 can generate a broadcast ephemeral message. More specifically, in response to receiving user input selecting multiple client devices (e.g., multiple accounts corresponding to multiple messaging threads) and a message, the digital communications system 104 can generate a broadcast ephemeral message containing the original message, the identifiers, and the current ephemeral settings of each selected client device.

As shown in FIG. 6A, the digital communications system 104 has received user input selecting message threads corresponding to "Jill," and "John," to receive the broadcast ephemeral message. As mentioned, the recipient designation area 606 can include a menu including a listing of selectable elements corresponding to various ephemeral messaging threads. Additionally, in one or more embodiments, the recipient designation area 606 can include a text input element. In such embodiments, the digital communications system 104 can identify selected message threads based on text identifying user identifiers corresponding to messaging threads. Further, the digital communications system 104 can receive and interpret a variety of additional types of user input at the recipient designation area 606.

As discussed above, upon submission of the ephemeral message for transmission to a plurality of receiving devices, the digital communications system 104 can generate and transmit encrypted digital communications that include the broadcast ephemeral message. In particular, the digital communications system 104 can generate an encrypted digital communication that includes the broadcast ephemeral message, an ephemeral message duration setting, and an ephemeral setting timestamp. As mentioned, the ephemeral message duration setting can be an ephemeral message duration setting unique to each receiving client device and/or each ephemeral messaging thread selected to receive the broadcast ephemeral message.

FIGS. 6B-6C illustrate receiving client devices receiving the broadcast ephemeral message generated in FIG. 6A. In particular, FIGS. 6B-6C illustrate ephemeral message threads with different ephemeral message duration settings receiving the broadcast ephemeral message. As shown in FIG. 6B, the receiving client device 610 presents the messaging graphical user interface 612 including the ephemeral messaging thread corresponding to "Jill." The transmitting client device 600 transmits the broadcast ephemeral message 614 to the receiving client device 610 including the updated ephemeral message duration setting. Accordingly, the digital communications system 104 can update the ephemeral message duration setting for the ephemeral messaging thread corresponding to the ephemeral message thread corresponding to "Jill." Further, the digital communications system 104 adds the ephemeral message 614 to the ephemeral message thread corresponding to "Jill" at the receiving client device 610.

Accordingly, the messaging graphical user interface 612 includes the ephemeral message 614 and the ephemeral message duration indicator 616. The ephemeral message duration indicator 616 reflects the ephemeral message duration setting of two hours. Thus, the digital communications system 104 can delete the ephemeral message 614 after two hours. Further, the digital communications system 104 can apply the ephemeral message duration setting of two hours to further ephemeral messages included in the ephemeral messaging thread.

As shown in FIG. 6C, the receiving client device 620 presents the messaging graphical user interface 622 including the ephemeral messaging thread corresponding to "John." The transmitting client device 600 transmits the unique encrypted digital communication including the broadcast ephemeral message 624 to the receiving client device 620. Further, the unique encrypted digital communication includes an updated ephemeral message duration setting of two hours for the ephemeral message thread corresponding to "John." The digital communications system 104 then adds the ephemeral message 614 to the ephemeral messaging thread corresponding to "John" at the receiving client device 620. Further, the digital communications system 104 applies the updated ephemeral message duration setting to the ephemeral message 614.

Accordingly, the messaging graphical user interface 622 includes the ephemeral message 624 and the ephemeral message duration indicator 626. The ephemeral message duration indicator 626 reflects the updated ephemeral message duration setting of two hours. Thus, the digital communications system 104 can delete the ephemeral message 624 after two hours.

Further, the messaging graphical user interface 622 includes an additional ephemeral message 628 with an associated additional ephemeral message duration indicator 630. The digital communications system 104 can provide a broadcast ephemeral message to an ephemeral messaging thread already including one or more additional ephemeral messages. The additional ephemeral message 628 corresponds to an existing ephemeral message duration setting of one hour. Further, as shown in FIG. 6C, 56 minutes remain of the one hour ephemeral message duration setting.

However, the ephemeral message 628 existed in the ephemeral messaging thread prior to the receipt of the ephemeral message 624 (and/or prior to the ephemeral setting timestamp corresponding updated ephemeral message duration setting). As discussed above, in one or more embodiments, the digital communications system 104 does not apply updated ephemeral message duration settings to existing messages in ephemeral messaging threads. Thus, the digital communications system 104 does not apply the updated ephemeral message duration setting to the additional ephemeral message 628. Accordingly, the digital communications system 104 can delete the ephemeral message 624 after two hours and the additional ephemeral message after one hour (in accordance with the existing ephemeral message duration setting).

Figure 7:
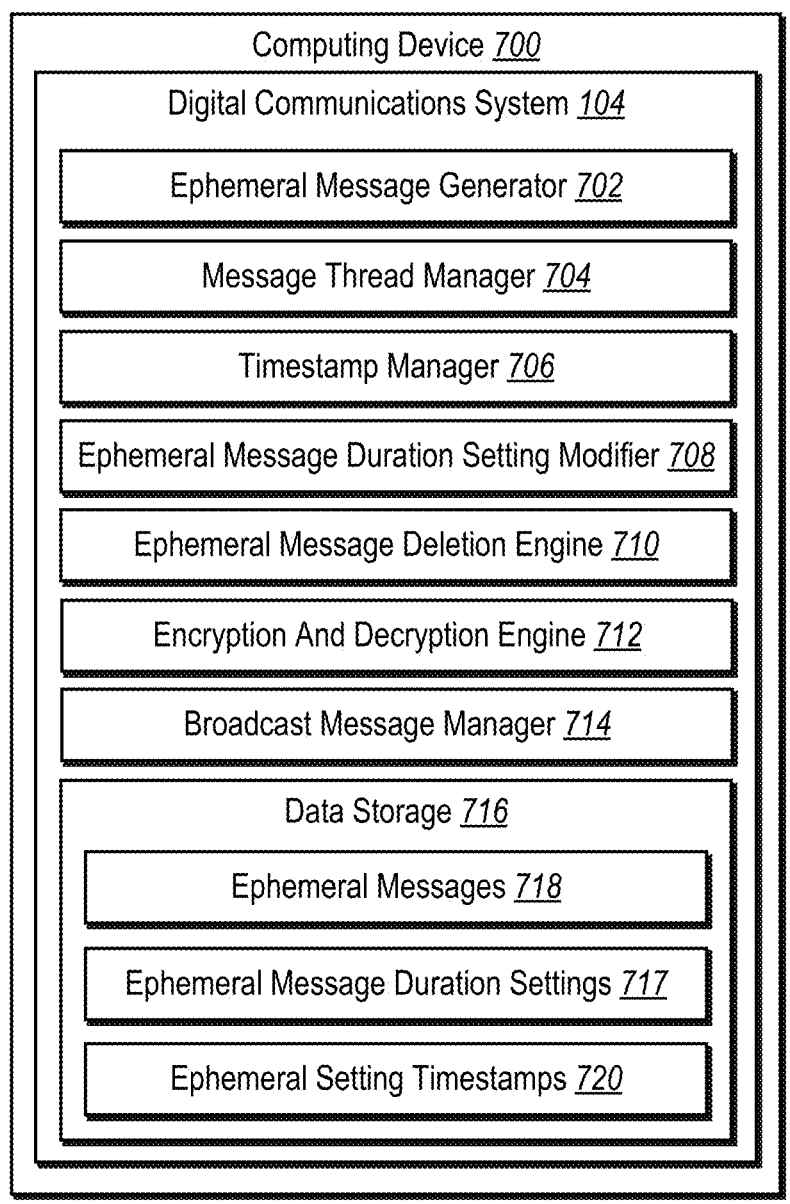
FIG. 7 illustrates a schematic diagram of a digital communication system in accordance with one or more embodiments

Turning to FIG. 7, additional detail will now be provided regarding various components and capabilities of the digital communication system 104. In particular, FIG. 7 illustrates an example schematic diagram of the digital communication system 104 implemented by a computing device 700 (e.g., the transmitting client device 102, the receiving client device 106, and/or the server(s) 108) in accordance with one or more embodiments of the present disclosure. As shown, the computing device 700 can implement the digital communication system 104. Also illustrated, the digital communications system 104 can include an ephemeral message generator 702, a message thread manager 704, a timestamp manager 706, an ephemeral message duration setting modifier 708, an ephemeral message deletion engine 710, an encryption and decryption engine 712, a broadcast message manager 714, and data storage 716.

The computing device 700 includes the ephemeral message generator 702. The ephemeral message generator 702 can generate ephemeral messages including ephemeral message duration settings, and ephemeral setting timestamps. Further, the ephemeral message generator 702 can encrypt the ephemeral messages, ephemeral message duration settings, and ephemeral setting timestamps. The ephemeral message generator 702 can utilize user input received at a transmitting client device to generate the ephemeral message, including contents of the ephemeral message and one or more recipients of the ephemeral message. Additionally, the ephemeral message generator 702 can utilize user input received at the transmitting client device to determine an ephemeral message duration setting and/or an ephemeral setting timestamp.

Also, the computing device 700 includes a message thread manager 704. In one or more embodiments, the message thread manager 704 adds ephemeral messages to message threads (including ephemeral message threads). To illustrate, the message thread manager 704 can add a message to a message thread at a receiving client device based on identifying the received message. Further, the message thread manager 704 can add a message to a message thread at a transmitting client device based on identifying the transmitted message.

Further, the computing device 700 includes a timestamp manager 706. The timestamp manager 706 can compare ephemeral setting timestamps to determine modifications to ephemeral message duration settings. For example, the timestamp manager 706 can compare an ephemeral setting timestamp to an existing setting timestamp on a receiving client device. In some embodiments, the timestamp manager 706 compares ephemeral message duration settings for any incoming ephemeral message to identify any updated ephemeral message duration settings.

Additionally, the computing device 700 includes an ephemeral message duration setting modifier 708. The ephemeral message duration setting modifier 708 can determine that the existing setting timestamp predates the ephemeral setting timestamp. Further, the ephemeral message duration setting modifier 708 can modify the existing ephemeral message duration setting to the ephemeral message duration setting. Further, the ephemeral message duration setting can modify a variety of ephemeral message duration settings.

Further, the computing device 700 includes the ephemeral message deletion engine 710. The ephemeral message deletion engine 710 can delete ephemeral messages from ephemeral messaging threads. More specifically, the ephemeral message deletion engine 710 can apply ephemeral message duration settings to delete ephemeral messages upon expiration. In some embodiments, the ephemeral message deletion engine 710 can determine and track such times of expiration for ephemeral messages. Accordingly, in one or more embodiments, the ephemeral message deletion engine 710 detects and tracks triggering events and begins the countdown of corresponding ephemeral message duration settings.

Also, the computing device 700 includes an encryption and decryption engine 712. The encryption and decryption engine 712 can encrypt and/or decrypt electronic messages. To illustrate, the encryption and decryption engine 712 can encrypt and/or decrypt ephemeral messages, ephemeral message duration settings, and ephemeral setting timestamps. The encryption and decryption engine 712 can encrypt ephemeral message for secure transmission. The encryption and decryption engine 712 can also decrypt ephemeral messages such that the timestamp manager 706 and ephemeral message duration setting modifier 708 and various other components of the digital communication system 104 can utilize ephemeral messages, ephemeral message duration settings, and ephemeral setting timestamps.

Additionally, the computing device 700 includes a broadcast message manager 714. The broadcast message manager 714 can generate and transmit broadcast messages. Further, the broadcast message manager 714 can transmit broadcast ephemeral messages to a variety of receiving client devices on a variety of message threads. Further, the broadcast message manager 714 can transmit the broadcast ephemeral messages for a single broadcast with varying ephemeral message duration settings.

Figure 9:
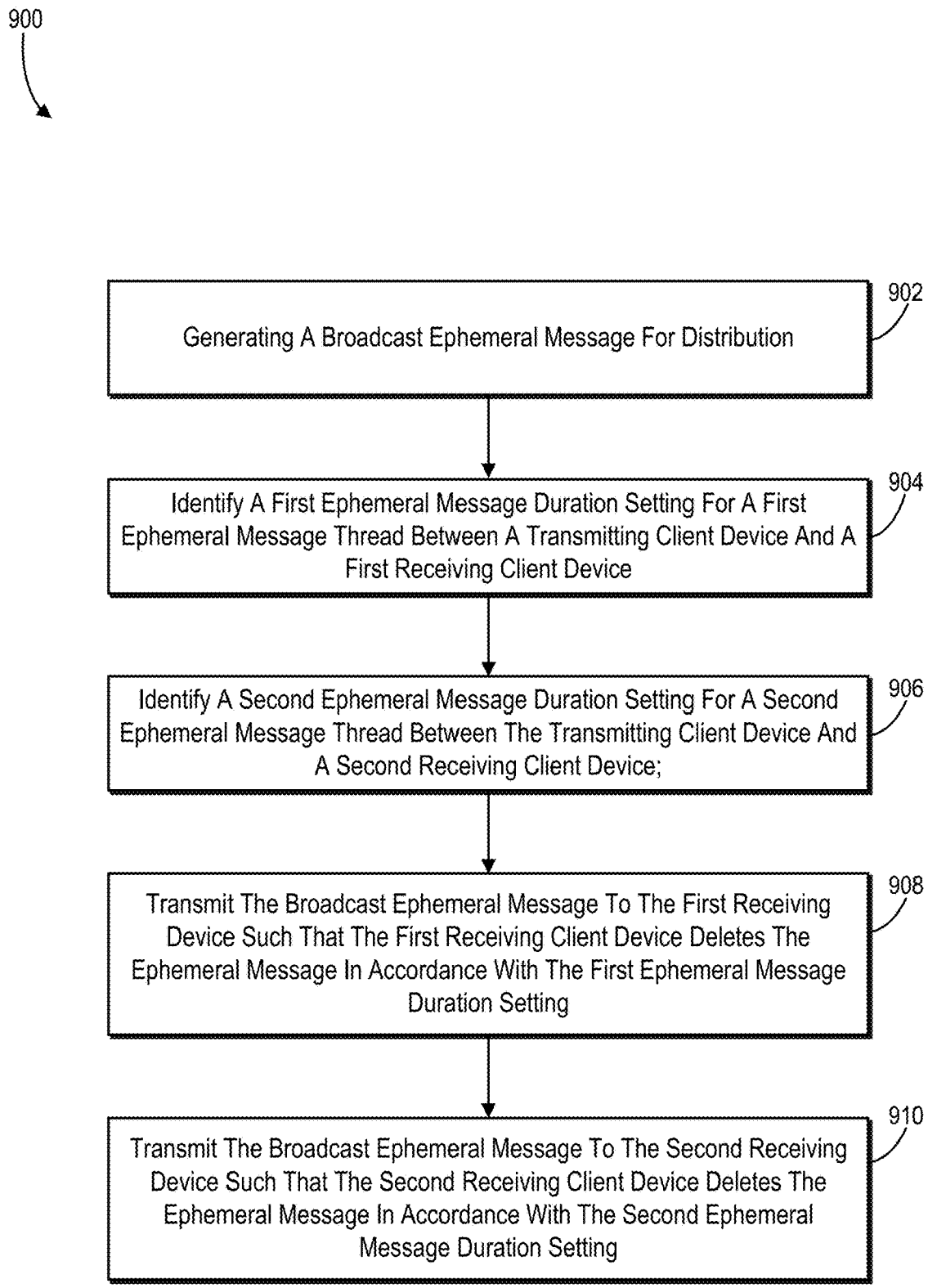
FIG. 9 illustrates a flowchart of a series of acts for generating and transmitting a broadcast ephemeral message in accordance with one or more embodiments.

Further, the computing device 700 includes data storage 716. The data storage 716 maintains data for the digital communication system 104. The data storage 716 (e.g., via one or more memory devices) can maintain data of any type, size, or kind, as necessary to perform the functions of the digital communication system 104, including data received from. For example, as shown in FIG. 9, the digital communications system 104 can include ephemeral messages 718, ephemeral message duration settings 719, and ephemeral setting timestamps 720.

Each of the components 702-716 of the digital communication system 104 can include software, hardware, or both. For example, the components 702-716 can include one or more instructions stored on a computer-readable storage medium and executable by processors of one or more computing devices, such as a client device or server device. When executed by the one or more processors, the computer-executable instructions of the digital communication system 104 can cause the computing device(s) to perform the methods described herein. Alternatively, the components 702-716 can include hardware, such as a special-purpose processing device to perform a certain function or group of functions. Alternatively, the components 702-716 of the digital communication system 104 can include a combination of computer-executable instructions and hardware.

Furthermore, the components 702-716 of the digital communication system 104 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 702-716 may be implemented as a stand-alone application, such as a desktop or mobile application. Furthermore, the components 702-716 may be implemented as one or more web-based applications hosted on a remote server. The components 702-716 may also be implemented in a suite of mobile device applications or "apps."

Figure 8:
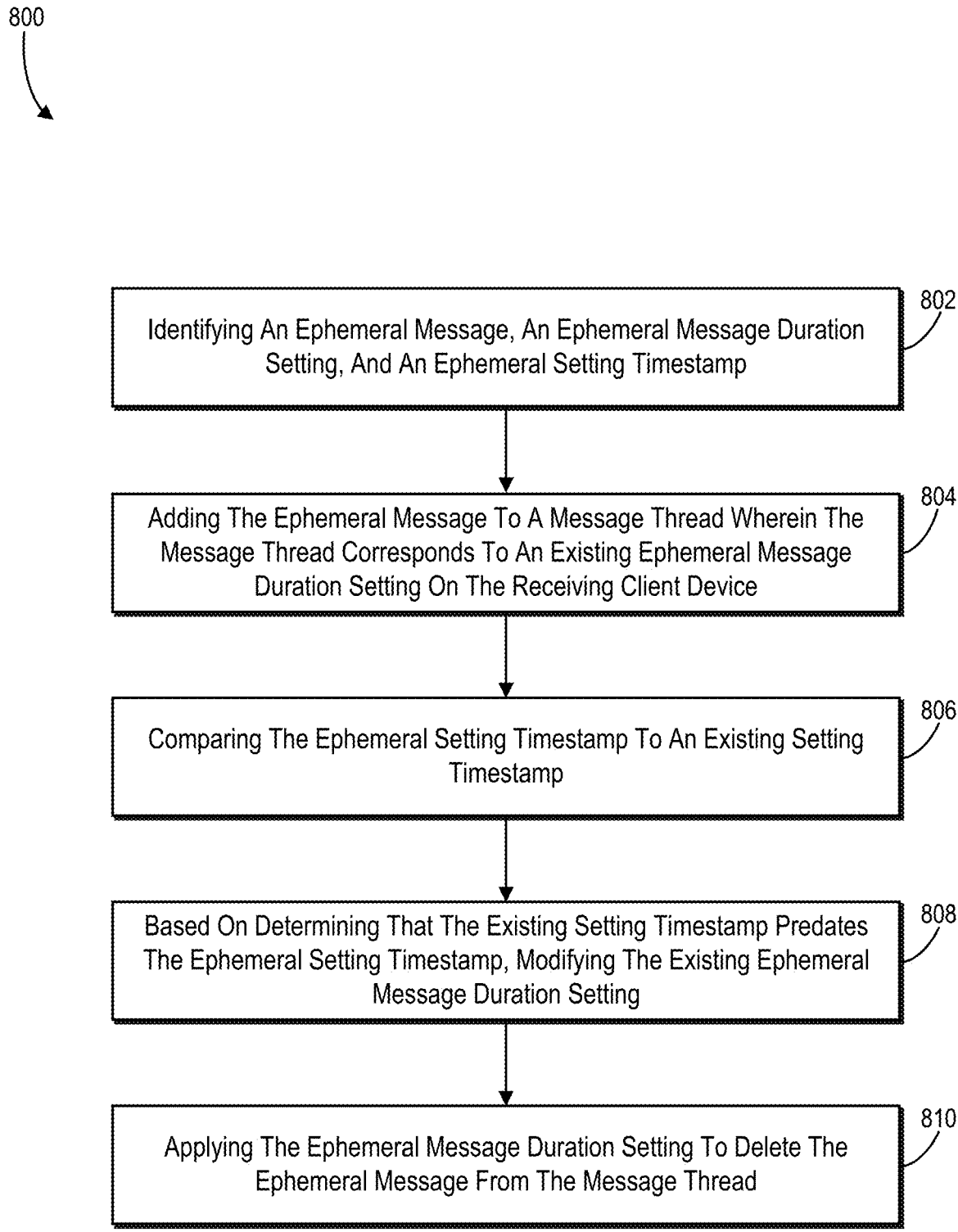
FIG. 8 illustrates a flowchart of a series of acts for modifying and applying an ephemeral message duration setting in accordance with one or more embodiments.

FIGS. 1-7, the corresponding text, and the examples provide a number of different methods, systems, devices, and non-transitory computer-readable media of the digital communication system. In addition to the foregoing, one or more embodiments can also be described in terms of flowcharts comprising acts for accomplishing a particular result, as shown in FIG. 8 and FIG. 9. FIG. 8 and FIG. 9 may be performed with more or fewer acts. Further, the acts may be performed in differing orders. Additionally, the acts described herein may be repeated or performed in parallel with one another or parallel with different instances of the same or similar acts.

As mentioned, FIG. 8 illustrates a flowchart of a series of acts 800 for modifying and applying an ephemeral message duration setting in accordance with one or more embodiments in accordance with one or more embodiments. While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer-readable medium can comprise instructions that, when executed by one or more processors, cause a computing device to perform the acts of FIG. 8. In some embodiments, a system can perform the acts of FIG. 8.

As shown in FIG. 8, the series of acts 800 includes an act 802 for identifying an ephemeral message, an ephemeral message duration setting, and an ephemeral setting timestamp. In particular, the act 802 can include identifying, at a receiving client device, an ephemeral message, an ephemeral message duration setting, and an ephemeral setting timestamp generated by a transmitting client device. Specifically, the act 802 can include receiving one or more encrypted digital communications generated and sent by the transmitting client device, and decrypting the one or more encrypted digital communications to identify the ephemeral message, the ephemeral message duration setting, and the ephemeral setting timestamp.

Further, the series of acts 800 includes an act 804 for adding the ephemeral message to a message thread wherein the message thread corresponds to an existing ephemeral message duration setting on the receiving client device. In particular, the act 804 can include adding the ephemeral message to a message thread between the receiving client device and the transmitting client device, wherein the message thread corresponds to an existing ephemeral message duration setting on the receiving client device. Specifically, the act 804 can include wherein the ephemeral message is a broadcast ephemeral messages generated by the transmitting client device for distribution to a plurality of receiving client devices to be deleted in accordance with a plurality of ephemeral message duration settings.

Additionally, the series of acts 800 includes an act 806 for comparing the ephemeral setting timestamp to an existing setting timestamp. In particular, the act 806 can include comparing the ephemeral setting timestamp to an existing setting timestamp on the receiving client device.

Also, the series of acts 800 includes an act 808 for based on determining that the existing setting timestamp predates the ephemeral setting timestamp, modifying the existing ephemeral message duration setting. In particular, the act 808 can include based on determining that the existing setting timestamp predates the ephemeral setting timestamp, modifying the existing ephemeral message duration setting for the message thread to the ephemeral message duration setting. Specifically, the act 808 can include generating a notification of the ephemeral message duration setting, and presenting, in a message thread graphical user interface on the receiving client device, the notification of the ephemeral message duration setting.

Further, the series of acts 800 includes an act 810 for applying the ephemeral message duration setting to delete the ephemeral message from the message thread. In particular, the act 810 can include applying the ephemeral message duration setting to delete the ephemeral message from the message thread on the receiving client device. Specifically, the act 810 can include detecting, at the receiving client device, a user interaction with the ephemeral message in the message thread, and in response to determining that a time duration after the user interaction exceeds the ephemeral message duration, deleting the ephemeral message from the message thread. The act 810 can also include identifying an existing message in the message thread, and based on determining that the existing message predates the ephemeral setting timestamp, applying the existing ephemeral message duration setting to delete the message from the message thread on the receiving client device.

The series of acts 800 can also include receiving, at the receiving client device, a second ephemeral message, adding the second ephemeral message to the message thread, and applying the ephemeral message duration setting to delete the second ephemeral message from the message thread on the receiving client device.

As mentioned, FIG. 9 illustrates a flowchart of a series of acts 900 for generating and transmitting a broadcast ephemeral message in accordance with one or more embodiments in accordance with one or more embodiments. While FIG. 9 illustrates acts according to one embodiment, alternative embodiments may omit, add to, reorder, and/or modify any of the acts shown in FIG. 9. The acts of FIG. 9 can be performed as part of a method. Alternatively, a non-transitory computer-readable medium can comprise instructions that, when executed by one or more processors, cause a computing device to perform the acts of FIG. 9. In some embodiments, a system can perform the acts of FIG. 9.

As shown in FIG. 9, the series of acts 900 includes an act 902 for generating a broadcast ephemeral message for distribution. In particular, the act 902 can include generating a broadcast ephemeral message for distribution to a first receiving client device and a second receiving client device. Specifically, the act 902 can include providing, for display, a user interface comprising a broadcast ephemeral message input element and selectable elements corresponding to a plurality of receiving client devices, and generating the broadcast ephemeral message for distribution to the first receiving device and the second receiving client device in response to user interaction with the broadcast ephemeral message input element, a first selectable element of the selectable elements corresponding to the first receiving client device, and a second selectable element of the selectable elements corresponding to the second receiving client device.

Further, the series of acts 900 includes an act 904 for identifying a first ephemeral message duration setting for a first ephemeral message thread between a transmitting client device and a first receiving client device. In particular, the act 904 can include identifying a first ephemeral message duration setting at the transmitting client device for a first ephemeral message thread between the transmitting client device and the first receiving client device. Specifically, the act 904 can include identify an existing ephemeral message duration setting at the transmitting client device for the first ephemeral message, and in response to user selection of the first ephemeral message duration setting, modify the existing ephemeral message duration setting to the first ephemeral message duration setting.

Additionally, the series of acts 900 includes an act 906 for identifying a second ephemeral message duration setting for a second ephemeral message thread between the transmitting client device and a second receiving client device. In particular, the act 906 can include identifying a second ephemeral message duration setting at the transmitting client device for a second ephemeral message thread between the transmitting client device and the second receiving client device. Specifically, the act 906 can include wherein the first ephemeral message duration setting comprises a first time duration and the second ephemeral message duration setting comprises a second time duration different from the first time duration.

Also, the series of acts 900 includes an act 908 for transmitting the broadcast ephemeral message to the first receiving device such that the first receiving client device deletes the ephemeral message in accordance with the first ephemeral message duration setting. In particular, the act 908 can include transmit the broadcast ephemeral message, a first timestamp, and the first ephemeral message duration setting to the first receiving device such that the first receiving client device deletes the ephemeral message in accordance with the first ephemeral message duration setting. Specifically, the act 908 can include transmitting the broadcast ephemeral message by generating a first set of encrypted digital communications comprising the broadcast ephemeral message, the first timestamp, and the first ephemeral message duration setting for transmission to the first receiving device and generating a second set of encrypted digital communications comprising the broadcast ephemeral message, the second timestamp, and the second ephemeral message duration setting for transmission to the second receiving device. Further, the act 908 can include transmitting a second broadcast ephemeral message to the first receiving client device such that the first receiving client device deletes the second broadcast ephemeral message from the first ephemeral message thread in accordance with the first ephemeral message duration setting Further, the series of acts 900 includes an act 910 for transmitting the broadcast ephemeral message to the second receiving device such that the second receiving client device deletes the ephemeral message in accordance with the second ephemeral message duration setting. In particular, the act 910 can include transmitting the broadcast ephemeral message, a second timestamp, and the second ephemeral message duration setting to the second receiving device such that the second receiving client device deletes the ephemeral message in accordance with the second ephemeral message duration setting.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
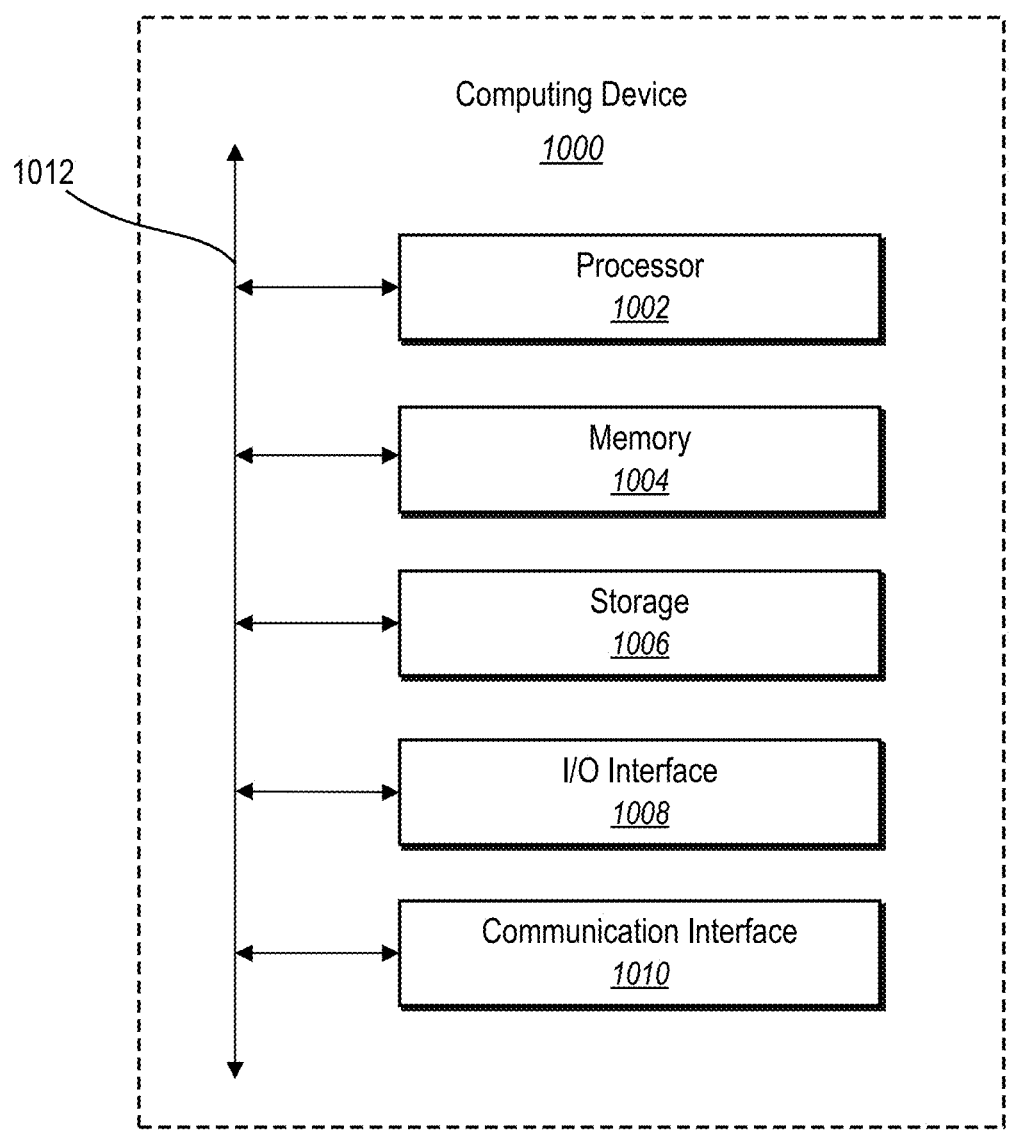
FIG. 10 illustrates a block diagram of an example computing device in accordance with one or more embodiments.

FIG. 10 illustrates a block diagram of exemplary computing device 1000 that may be configured to perform one or more of the processes described above. One will appreciate that one or more computing devices such as the computing device 1000 may implement the digital communications system described above. Furthermore, the computing device 1000 can include the transmitting client device 102, the receiving client device 106 and/or the server(s) 108. As shown by FIG. 10, the computing device 1000 can comprise a processor 1002, a memory 1004, a storage device 1006, an I/O interface 1008, and a communication interface 1010, which may be communicatively coupled by way of a communication infrastructure 1012. While an exemplary computing device 1000 is shown in FIG. 10, the components illustrated in FIG. 10 are not intended to be limiting. Additional or alternative components may be used in other embodiments. Furthermore, in certain embodiments, the computing device 1000 can include fewer components than those shown in FIG. 10. Components of the computing device 1000 shown in FIG. 10 will now be described in additional detail.

In one or more embodiments, the processor 1002 includes hardware for executing instructions, such as those making up a computer program. As an example and not by way of limitation, to execute instructions, the processor 1002 may retrieve (or fetch) the instructions from an internal register, an internal cache, the memory 1004, or the storage device 1006 and decode and execute them. In one or more embodiments, the processor 1002 may include one or more internal caches for data, instructions, or addresses. As an example and not by way of limitation, the processor 1002 may include one or more instruction caches, one or more data caches, and one or more translation lookaside buffers ("TLBs"). Instructions in the instruction caches may be copies of instructions in the memory 1004 or the storage device 1006.

The memory 1004 may be used for storing data, metadata, and programs for execution by the processor(s). The memory 1004 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1004 may be internal or distributed memory.

The storage device 1006 includes storage for storing data or instructions. As an example and not by way of limitation, storage device 1006 can comprise a non-transitory storage medium described above. The storage device 1006 may include a hard disk drive ("HDD"), flash memory, an optical disc, a magneto-optical disc, magnetic tape, or a Universal Serial Bus ("USB") drive or a combination of two or more of these. The storage device 1006 may include removable or non-removable (or fixed) media, where appropriate. The storage device 1006 may be internal or external to the computing device 1000. In one or more embodiments, the storage device 1006 is non-volatile, solid-state memory. In other embodiments, the storage device 1006 includes read-only memory ("ROM"). Where appropriate, this ROM may be mask programmed ROM, programmable ROM ("PROM"), erasable PROM ("EPROM"), electrically erasable PROM ("EEPROM"), electrically alterable ROM ("EAROM"), or flash memory or a combination of two or more of these.

The I/O interface 1008 allows a user to provide input to, receive output from, and otherwise transfer data to and receive data from computing device 1000. The I/O interface 1008 may include a mouse, a keypad or a keyboard, a touchscreen, a camera, an optical scanner, network interface, modem, other known I/O devices or a combination of such I/O interfaces. The I/O interface 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1008 is configured to provide graphical data to a display for presentation to a user. The graphical data may be representative of one or more graphical user interfaces and/or any other graphical content as may serve a particular implementation.

The communication interface 1010 can include hardware, software, or both. In any event, the communication interface 1010 can provide one or more interfaces for communication (such as, for example, packet-based communication) between the computing device 1000 and one or more other computing devices or networks. As an example and not by way of limitation, the communication interface 1010 may include a network interface controller ("NIC") or network adapter for communicating with an Ethernet or other wire-based network or a wireless NIC ("WNIC") or wireless adapter for communicating with a wireless network, such as a WI-FI.

Additionally, or alternatively, the communication interface 1010 may facilitate communications with an ad hoc network, a personal area network ("PAN"), a local area network ("LAN"), a wide area network ("WAN"), a metropolitan area network ("MAN"), or one or more portions of the Internet or a combination of two or more of these. One or more portions of one or more of these networks may be wired or wireless. As an example, the communication interface 1010 may facilitate communications with a wireless PAN ("WPAN") (such as, for example, a BLUETOOTH WPAN), a WI-FI network, a WI-MAX network, a cellular telephone network (such as, for example, a Global System for Mobile Communications ("GSM") network), or other suitable wireless network or a combination thereof.

Additionally, the communication interface 1010 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 1012 may include hardware, software, or both that couples components of the computing device 1000 to each other. As an example and not by way of limitation, the communication infrastructure 1012 may include an Accelerated Graphics Port ("AGP") or other graphics bus, an Enhanced Industry Standard Architecture ("EISA") bus, a front-side bus ("FSB"), a HYPERTRANSPORT ("HT") interconnect, an Industry Standard Architecture ("ISA") bus, an INFINIBAND interconnect, a low-pin-count ("LPC") bus, a memory bus, a Micro Channel Architecture ("MCA") bus, a Peripheral Component Interconnect ("PCI") bus, a PCI-Express ("PCIe") bus, a serial advanced technology attachment ("SATA") bus, a Video Electronics Standards Association local ("VLB") bus, or another suitable bus or a combination thereof.

As mentioned above, in one or more embodiments, the digital communications system comprises a social-networking system. A social-networking system may enable its users (such as persons or organizations) to interact with the system and with each other. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, on-line calendars and event organization, messaging, games, or advertisements) to facilitate social interaction between or among users. Also, the social-networking system may allow users to post photographs and other visual media items to a user's profile page (typically known as "wall posts" or "timeline posts") or in a photo album, both of which may be accessible to other users of the social-networking system depending upon the user's configured privacy settings.

Figure 11:
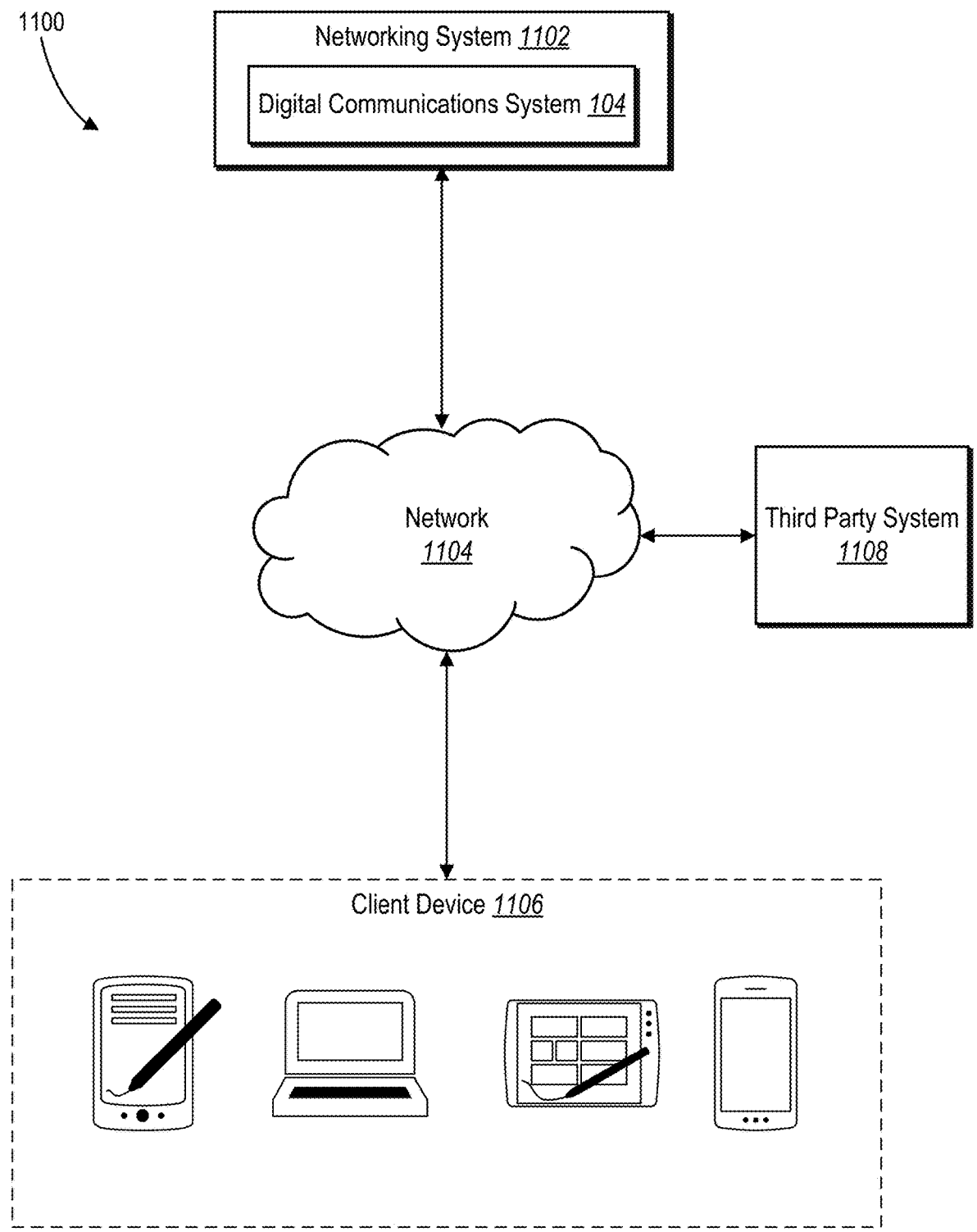
FIG. 11 illustrates a network environment of a social networking system according to one or more embodiments.

FIG. 11 illustrates an example network environment 1100 of a social-networking system. Network environment 1100 includes a client device 1106, a social networking system 1102, and a third-party system 11010 connected to each other by a network 1104. Although FIG. 11 illustrates a particular arrangement of client device 1106, social networking system 1102, third-party system 1108, and network 1104, this disclosure contemplates any suitable arrangement of client device 1106, social networking system 1102, third-party system 1108, and network 1104. As an example and not by way of limitation, two or more of client device 1106, social networking system 1102, and third-party system 1108 may be connected to each other directly, bypassing network 1104. As another example, two or more of client device 1106, social networking system 1102, and third-party system 1108 may be physically or logically co-located with each other in whole or in part. Moreover, although FIG. 11 illustrates a particular number of client devices 1106, social networking systems 1102, third-party systems 1108, and networks 1104, this disclosure contemplates any suitable number of client devices 1106, social networking systems 1102, third-party systems 1108, and networks 1104. As an example and not by way of limitation, network environment 1100 may include multiple client devices 1106, social networking systems 1102, third-party systems 1108, and networks 1104.

This disclosure contemplates any suitable network 1104. As an example and not by way of limitation, one or more portions of network 1104 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 1104 may include one or more networks 1104.

Links may connect client device 1106, social networking system 1102, and third-party system 1108 to communication network 1104 or to each other. This disclosure contemplates any suitable links. In particular embodiments, one or more links include one or more wireline (such as for example Digital Subscriber Line ("DSL") or Data Over Cable Service Interface Specification ("DOCSIS")), wireless (such as for example Wi-Fi or Worldwide Interoperability for Microwave Access ("WiMAX")), or optical (such as for example Synchronous Optical Network ("SONET") or Synchronous Digital Hierarchy ("SDH")) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1100. One or more first links may differ in one or more respects from one or more second links.

In particular embodiments, client device 1106 may be an electronic device including hardware, software, or embedded logic components or a combination of two or more such components and capable of carrying out the appropriate functionalities implemented or supported by client device 1106. As an example and not by way of limitation, a client device 1106 may include any of the computing devices discussed above in relation to FIG. 11. A client device 1106 may enable a network user at client device 1106 to access network 1104. A client device 1106 may enable its user to communicate with other users at other client devices 1106.

In particular embodiments, client device 1106 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client device 1106 may enter a Uniform Resource Locator ("URL") or other address directing the web browser to a particular server (such as server, or a server associated with a third-party system 1108), and the web browser may generate a Hyper Text Transfer Protocol ("HTTP") request and communicate the HTTP request to server. The server may accept the HTTP request and communicate to client device 1106 one or more Hyper Text Markup Language ("HTML") files responsive to the HTTP request. Client device 1106 may render a webpage based on the HTML files from the server for presentation to the user. This disclosure contemplates any suitable webpage files. As an example and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social networking system 1102 may be a network-addressable computing system that can host an online social network. Social networking system 1102 may generate, store, receive, and send social-networking data, such as, for example, user-profile data, concept-profile data, social-graph information, or other suitable data related to the online social network. Social networking system 1102 may be accessed by the other components of network environment 1100 either directly or via network 1104. In particular embodiments, social networking system 1102 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, social networking system 1102 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 1106, a social networking system 1102, or a third-party system 1108 to manage, retrieve, modify, add, or delete, the information stored in data store.

In particular embodiments, social networking system 1102 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Social networking system 1102 may provide users of the online social network the ability to communicate and interact with other users. In particular embodiments, users may join the online social network via social networking system 1102 and then add connections (e.g., relationships) to a number of other users of social networking system 1102 whom they want to be connected to. Herein, the term "friend" may refer to any other user of social networking system 1102 with whom a user has formed a connection, association, or relationship via social networking system 1102.

In particular embodiments, social networking system 1102 may provide users with the ability to take actions on various types of items or objects, supported by social networking system 1102. As an example and not by way of limitation, the items and objects may include groups or social networks to which users of social networking system 1102 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social networking system 1102 or by an external system of third-party system 1108, which is separate from social networking system 1102 and coupled to social networking system 1102 via a network 1104.

In particular embodiments, social networking system 1102 may be capable of linking a variety of entities. As an example and not by way of limitation, social networking system 1102 may enable users to interact with each other as well as receive content from third-party systems 1108 or other entities, or to allow users to interact with these entities through an application programming interfaces ("API") or other communication channels.

In particular embodiments, a third-party system 1108 may include one or more types of servers, one or more data stores, one or more interfaces, including but not limited to APIs, one or more web services, one or more content sources, one or more networks, or any other suitable components, e.g., that servers may communicate with. A third-party system 1108 may be operated by a different entity from an entity operating social networking system 1102. In particular embodiments, however, social networking system 1102 and third-party systems 1108 may operate in conjunction with each other to provide social-networking services to users of social networking system 1102 or third-party systems 1108. In this sense, social networking system 1102 may provide a platform, or backbone, which other systems, such as third-party systems 1108, may use to provide social-networking services and functionality to users across the Internet.

In particular embodiments, a third-party system 1108 may include a third-party content object provider. A third-party content object provider may include one or more sources of content objects, which may be communicated to a client device 1106. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social networking system 1102 also includes user-generated content objects, which may enhance a user's interactions with social networking system 1102. User-generated content may include anything a user can add, upload, send, or "post" to social networking system 1102. As an example and not by way of limitation, a user communicates posts to social networking system 1102 from a client device 1106. Posts may include data such as status updates or other textual data, location information, photos, videos, links, music or other similar data or media. Content may also be added to social networking system 1102 by a third-party through a "communication channel," such as a newsfeed or stream.

In particular embodiments, social networking system 1102 may include a variety of servers, sub-systems, programs, modules, logs, and data stores. In particular embodiments, social networking system 1102 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social networking system 1102 may also include suitable components such as network interfaces, security mechanisms, load balancers, failover servers, management-and-network-operations consoles, other suitable components, or any suitable combination thereof. In particular embodiments, social networking system 1102 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social networking system 1102 to one or more client devices 1106 or one or more third-party system 1108 via network 1104. The web server may include a mail server or other messaging functionality for receiving and routing messages between social networking system 1102 and one or more client devices 1106. An API-request server may allow a third-party system 1108 to access information from social networking system 1102 by calling one or more APIs. An action logger may be used to receive communications from a web server about a user's actions on or off social networking system 1102. In conjunction with the action log, a third-party-content-object log may be maintained of user exposures to third-party-content objects. A notification controller may provide information regarding content objects to a client device 1106. Information may be pushed to a client device 1106 as notifications, or information may be pulled from client device 1106 responsive to a request received from client device 1106. Authorization servers may be used to enforce one or more privacy settings of the users of social networking system 1102. A privacy setting of a user determines how particular information associated with a user can be shared. The authorization server may allow users to opt in to or opt out of having their actions logged by social networking system 1102 or shared with other systems (e.g., third-party system 1108), such as, for example, by setting appropriate privacy settings. Third-party-content-object stores may be used to store content objects received from third parties, such as a third-party system 1108. Location stores may be used for storing location information received from client devices 1106 associated with users. Advertisement-pricing modules may combine social information, the current time, location information, or other suitable information to provide relevant advertisements, in the form of notifications, to a user.

Figure 12:
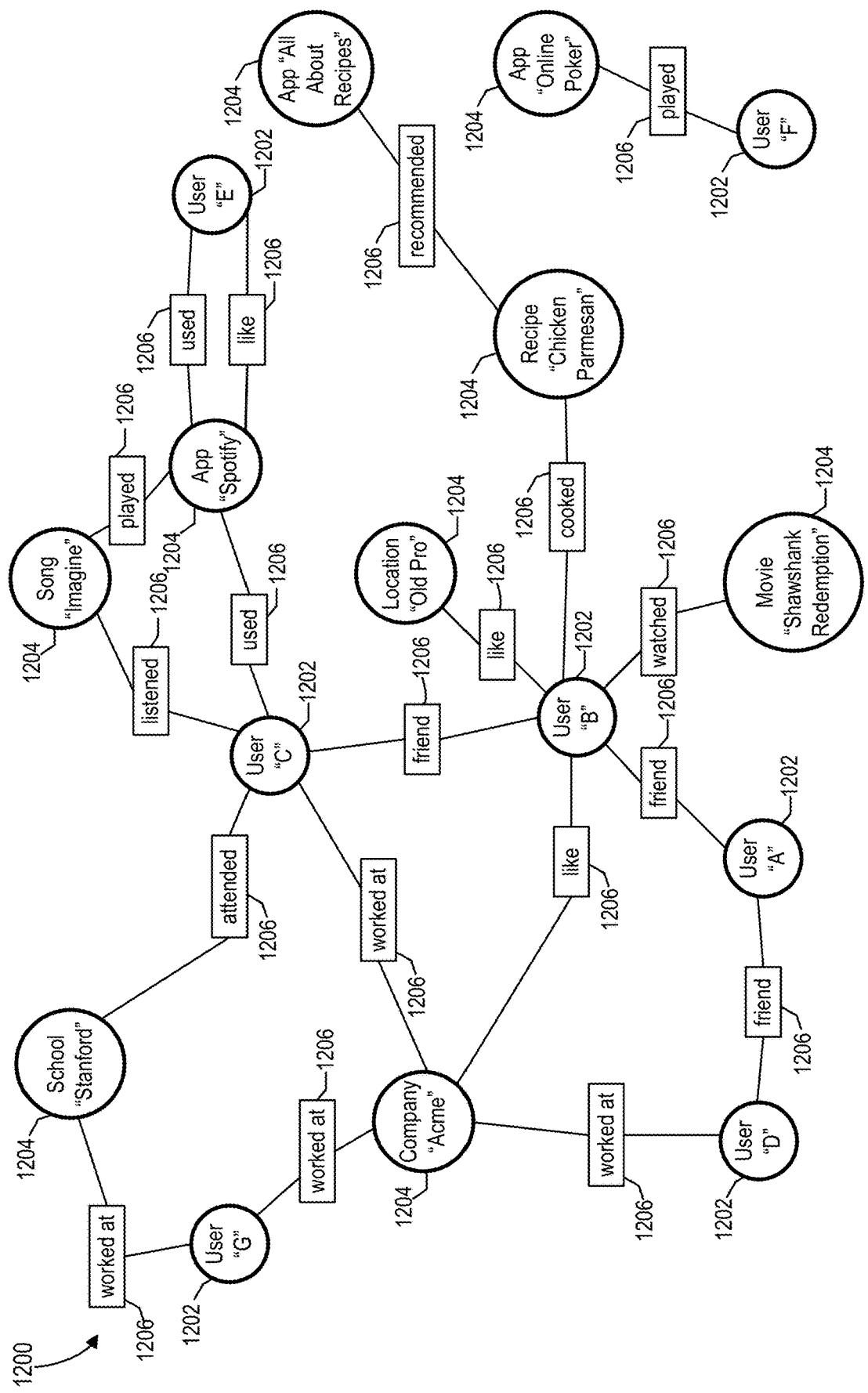
FIG. 12 illustrates an example social graph for a social networking system in accordance with one or more embodiments.

FIG. 12 illustrates example social graph 1200. In particular embodiments, social networking system 1122 may store one or more social graphs 1200 in one or more data stores. In particular embodiments, social graph 1200 may include multiple nodes—which may include multiple user nodes 1202 or multiple concept nodes 1204—and multiple edges 1206 connecting the nodes. Example social graph 1200 illustrated in FIG. 12 is shown, for didactic purposes, in a two-dimensional visual map representation. In particular embodiments, a social networking system 1102, client device 1106, or third-party system 1108 may access social graph 1200 and related social-graph information for suitable applications. The nodes and edges of social graph 1200 may be stored as data objects, for example, in a data store (such as a social-graph database). Such a data store may include one or more searchable or query able indexes of nodes or edges of social graph 1200.

In particular embodiments, a user node 1202 may correspond to a user of social networking system 1102. As an example and not by way of limitation, a user may be an individual (human user), an entity (e.g., an enterprise, business, or third-party application), or a group (e.g., of individuals or entities) that interacts or communicates with or over social networking system 1102. In particular embodiments, when a user registers for an account with social networking system 1102, social networking system 1102 may create a user node 1202 corresponding to the user, and store the user node 1202 in one or more data stores. Users and user nodes 1202 described herein may, where appropriate, refer to registered users and user nodes 1202 associated with registered users. In addition, or as an alternative, users and user nodes 1202 described herein may, where appropriate, refer to users that have not registered with social networking system 1102. In particular embodiments, a user node 1202 may be associated with information provided by a user or information gathered by various systems, including social networking system 1102. As an example and not by way of limitation, a user may provide his or her name, profile picture, contact information, birth date, sex, marital status, family status, employment, education background, preferences, interests, or other demographic information. Each user node of the social graph may have a corresponding web page (typically known as a profile page). In response to a request including a user name, the social-networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

In particular embodiments, a concept node 1204 may correspond to a concept. As an example and not by way of limitation, a concept may correspond to a place (such as, for example, a movie theater, restaurant, landmark, or city); a website (such as, for example, a website associated with social networking system 1102 or a third-party website associated with a web-application server); an entity (such as, for example, a person, business, group, sports team, or celebrity); a resource (such as, for example, an audio file, video file, digital photo, text file, structured document, or application) which may be located within social networking system 1102 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 1204 may be associated with information of a concept provided by a user or information gathered by various systems, including social networking system 1102. As an example and not by way of limitation, information of a concept may include a name or a title; one or more images (e.g., an image of the cover page of a book); a location (e.g., an address or a geographical location); a web site (which may be associated with a URL); contact information (e.g., a phone number or an email address); other suitable concept information; or any suitable combination of such information. In particular embodiments, a concept node 1204 may be associated with one or more data objects corresponding to information associated with concept nodes 1204. In particular embodiments, a concept node 1204 may correspond to one or more webpages.

In particular embodiments, a node in social graph 1200 may represent or be represented by a webpage (which may be referred to as a "profile page"). Profile pages may be hosted by or accessible to social networking system 1102. Profile pages may also be hosted on third-party websites associated with a third-party system 1108. As an example and not by way of limitation, a profile page corresponding to a particular external webpage may be the particular external webpage and the profile page may correspond to a particular concept node 1204. Profile pages may be viewable by all or a selected subset of other users. As an example and not by way of limitation, a user node 1202 may have a corresponding user-profile page in which the corresponding user may add content, make declarations, or otherwise express himself or herself. As another example and not by way of limitation, a concept node 1204 may have a corresponding concept-profile page in which one or more users may add content, make declarations, or express themselves, particularly in relation to the concept corresponding to concept nodes 1204.

In particular embodiments, a concept node 1204 may represent a third-party webpage or resource hosted by a third-party system 1108. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client device 1106 to send to social networking system 1102 a message indicating the user's action. In response to the message, social networking system 1102 may create an edge (e.g., an "eat" edge) between a user node 1202 corresponding to the user and a concept node 1204 corresponding to the third-party webpage or resource and store edge 1206 in one or more data stores.

In particular embodiments, a pair of nodes in social graph 1200 may be connected to each other by one or more edges 1206. An edge 1206 connecting a pair of nodes may represent a relationship between the pair of nodes. In particular embodiments, an edge 1206 may include or represent one or more data objects or attributes corresponding to the relationship between a pair of nodes. As an example and not by way of limitation, a first user may indicate that a second user is a "friend" of the first user. In response to this indication, social networking system 1102 may send a "friend request" to the second user. If the second user confirms the "friend request," social networking system 1102 may create an edge 1206 connecting the first user's user node 1202 to the second user's user node 1202 in social graph 1200 and store edge 1206 as social-graph information in one or more of data stores. In the example of FIG. 12, social graph 1200 includes an edge 1206 indicating a friend relation between user nodes 1202 of user "A" and user "B" and an edge indicating a friend relation between user nodes 1202 of user "C" and user "B." Although this disclosure describes or illustrates particular edges 1206 with particular attributes connecting particular user nodes 1202, this disclosure contemplates any suitable edges 1206 with any suitable attributes connecting user nodes 1202. As an example and not by way of limitation, an edge 1206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1200 by one or more edges 1206.

In particular embodiments, an edge 1206 between a user node 1202 and a concept node 1204 may represent a particular action or activity performed by a user associated with user node 1202 toward a concept associated with a concept node 1204. As an example and not by way of limitation, as illustrated in FIG. 12, a user may "like," "attended," "played," "listened," "cooked," "worked at," or "watched" a concept, each of which may correspond to an edge type or subtype. A concept-profile page corresponding to a concept node 1204 may include, for example, a selectable "check in" icon (such as, for example, a clickable "check in" icon) or a selectable "add to favorites" icon. Similarly, after a user clicks these icons, social networking system 1102 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social networking system 1102 may create a "listened" edge 1206 and a "used" edge (as illustrated in FIG. 12) between user nodes 1202 corresponding to the user and concept nodes 1204 corresponding to the song and application to indicate that the user listened to the song and used the application. Moreover, social networking system 1102 may create a "played" edge 1206 (as illustrated in FIG. 12) between concept nodes 1204 corresponding to the song and the application to indicate that the particular song was played by the particular application. In this case, "played" edge 1206 corresponds to an action performed by an external application (SPOTIFY) on an external audio file (the song "Imagine"). Although this disclosure describes particular edges 1206 with particular attributes connecting user nodes 1202 and concept nodes 1204, this disclosure contemplates any suitable edges 1206 with any suitable attributes connecting user nodes 1202 and concept nodes 1204. Moreover, although this disclosure describes edges between a user node 1202 and a concept node 1204 representing a single relationship, this disclosure contemplates edges between a user node 1202 and a concept node 1204 representing one or more relationships. As an example and not by way of limitation, an edge 1206 may represent both that a user likes and has used at a particular concept. Alternatively, another edge 1206 may represent each type of relationship (or multiples of a single relationship) between a user node 1202 and a concept node 1204 (as illustrated in FIG. 12 between user node 1202 for user "E" and concept nodes 1204 for "SPOTIFY").

In particular embodiments, social networking system 1102 may create an edge 1206 between a user node 1202 and a concept node 1204 in social graph 1200. As an example and not by way of limitation, a user viewing a concept-profile page (such as, for example, by using a web browser or a special-purpose application hosted by the user's client device 1106) may indicate that he or she likes the concept represented by the concept nodes 1204 by clicking or selecting a "Like" icon, which may cause the user's client device 1106 to send to social networking system 1102 a message indicating the user's liking of the concept associated with the concept-profile page. In response to the message, social networking system 1102 may create an edge 1206 between user node 1202 associated with the user and concept nodes 1204, as illustrated by "like" edge 1206 between the user and concept nodes 1204. In particular embodiments, social networking system 1102 may store an edge 1206 in one or more data stores. In particular embodiments, an edge 1206 may be automatically formed by social networking system 1102 in response to a particular user action. As an example and not by way of limitation, if a first user uploads a picture, watches a movie, or listens to a song, an edge 1206 may be formed between user node 1202 corresponding to the first user and concept nodes 1204 corresponding to those concepts. Although this disclosure describes forming particular edges 1206 in particular manners, this disclosure contemplates forming any suitable edges 1206 in any suitable manner. In one or more embodiments, the social networking system 1102 includes a node for each digital graphic and associated animation(s).

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition, or as an alternative, an advertisement may be one or more sponsored stories (e.g., a news-feed or ticker item on social networking system 1102). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social networking system 1102 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social networking system 1102) or RSVP (e.g., through social networking system 1102) to an event associated with the advertisement. In addition or as an alternative, an advertisement may include social-networking-system context directed to the user. As an example and not by way of limitation, an advertisement may display information about a friend of the user within social networking system 1102 who has taken an action associated with the subject matter of the advertisement.

In particular embodiments, social networking system 1102 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 1108 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social networking system 1102 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part based on the history of the user's actions. Coefficients may be used to predict any number of actions, which may be within or outside of the online social network. As an example and not by way of limitation, these actions may include various types of communications, such as sending messages, posting content, or commenting on content; various types of an observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social networking system 1102 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social networking system 1102 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social networking system 1102 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social networking system 1102 may calculate a coefficient based on a user's actions. Social networking system 1102 may monitor such actions on the online social network, on a third-party system 1108, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social networking system 1102 may calculate a coefficient based on the user's actions with particular types of content. The content may be associated with the online social network, a third-party system 1108, or another suitable system. The content may include users, profile pages, posts, news stories, headlines, instant messages, chat room conversations, emails, advertisements, pictures, video, music, other suitable objects, or any combination thereof. Social networking system 1102 may analyze a user's actions to determine whether one or more of the actions indicate an affinity for subject matter, content, other users, and so forth. As an example and not by way of limitation, if a user may make frequently posts content related to "coffee" or variants thereof, social networking system 1102 may determine the user has a high coefficient with respect to the concept "coffee." Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social networking system 1102 may calculate a coefficient based on the type of relationship between particular objects. Referencing the social graph 1200, social networking system 1102 may analyze the number and/or type of edges 1206 connecting particular user nodes 1202 and concept nodes 1204 when calculating a coefficient. As an example and not by way of limitation, user nodes 1202 that are connected by a spouse-type edge (representing that the two users are married) may be assigned a higher coefficient than user nodes 1202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social networking system 1102 may determine that the user has a higher coefficient with respect to the first photo than the second photo because having a tagged-in-type relationship with content may be assigned a higher weight and/or rating than having a like-type relationship with content. In particular embodiments, social networking system 1102 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social networking system 1102 may determine that the first user should also have a relatively high coefficient for the particular object. In particular embodiments, the coefficient may be based on the degree of separation between particular objects. Degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends." The lower coefficient may represent the decreasing likelihood that the first user will share an interest in content objects of the user that is indirectly connected to the first user in the social graph 1200. As an example and not by way of limitation, social-graph entities that are closer in the social graph 1200 (i.e., fewer degrees of separation) may have a higher coefficient than entities that are further apart in the social graph 1200.

In particular embodiments, social networking system 1102 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client device 1106 of the user). A first user may be more interested in other users or concepts that are closer to the first user. As an example and not by way of limitation, if a user is one mile from an airport and two miles from a gas station, social networking system 1102 may determine that the user has a higher coefficient for the airport than the gas station based on the proximity of the airport to the user.

In particular embodiments, social networking system 1102 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social networking system 1102 may provide information that is relevant to user's interests and current circumstances, increasing the likelihood that they will find such information of interest. In particular embodiments, social networking system 1102 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social networking system 1102 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social networking system 1102 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 1108 (e.g., via an API or other communication channel), or from another suitable system. In response to the request, social networking system 1102 may calculate the coefficient (or access the coefficient information if it has previously been calculated and stored). In particular embodiments, social networking system 1102 may measure an affinity with respect to a particular process. Different processes (both internal and external to the online social network) may request a coefficient for a particular object or set of objects. Social networking system 1102 may provide a measure of affinity that is relevant to the particular process that requested the measure of affinity. In this way, each process receives a measure of affinity that is tailored to the different context in which the process will use the measure of affinity.

In connection with social-graph affinity and affinity coefficients, particular embodiments may utilize one or more systems, components, elements, functions, methods, operations, or acts disclosed in U.S. patent application Ser. No. 11/503,093, filed 11 Aug. 2006, U.S. patent application Ser. No. 12/978,027, filed 22 Dec. 2010, U.S. patent application Ser. No. 12/978,265, filed 23 Dec. 2010, and U.S. patent application Ser. No. 13/642,869, filed 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 1204 corresponding to a particular photo may have a privacy setting specifying that the photo may only be accessed by users tagged in the photo and their friends. In particular embodiments, privacy settings may allow users to opt in or opt out of having their actions logged by social networking system 1102 or shared with other systems (e.g., third-party system 1108). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 1108, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, social networking system 1102 may send a request to the data store for the object. The request may identify the user associated with the request and may only be sent to the user (or a client device 1106 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A method comprising:
   identifying, at a receiving client device, an ephemeral message, an ephemeral message duration setting, and an ephemeral setting timestamp generated by a transmitting client device;
   adding the ephemeral message to a message thread between the receiving client device and the transmitting client device, wherein the message thread corresponds to an existing ephemeral message duration setting on the receiving client device;
   comparing the ephemeral setting timestamp to an existing setting timestamp on the receiving client device;
   based on determining that the existing setting timestamp predates the ephemeral setting timestamp, modifying the existing ephemeral message duration setting for the message thread to the ephemeral message duration setting; and
   applying the ephemeral message duration setting to delete the ephemeral message from the message thread on the receiving client device.

2. The method of claim 1, wherein identifying the ephemeral message, the ephemeral message duration setting, and the ephemeral setting timestamp generated by the transmitting client device comprises:
   receiving one or more encrypted digital communications generated and sent by the transmitting client device; and
   decrypting the one or more encrypted digital communications to identify the ephemeral message, the ephemeral message duration setting, and the ephemeral setting timestamp.

3. The method of claim 1, further comprising:
   receiving, at the receiving client device, a second ephemeral message;
   adding the second ephemeral message to the message thread; and
   applying the ephemeral message duration setting to delete the second ephemeral message from the message thread on the receiving client device.

4. The method of claim 1, further comprising:
   identifying an existing message in the message thread; and
   based on determining that the existing message predates the ephemeral setting timestamp, applying the existing ephemeral message duration setting to delete the message from the message thread on the receiving client device.

5. The method of claim 1, further comprising:
   generating a notification of the ephemeral message duration setting; and
   presenting, in a message thread graphical user interface on the receiving client device, the notification of the ephemeral message duration setting.

6. The method of claim 1, wherein the ephemeral message is a broadcast ephemeral message generated by the transmitting client device for distribution to a plurality of receiving client devices to be deleted in accordance with a plurality of ephemeral message duration settings.

7. The method of claim 1, further comprising: detecting, at the receiving client device, a user interaction with the ephemeral message in the message thread; and in response to determining that a time duration after the user interaction exceeds the ephemeral message duration setting, deleting the ephemeral message from the message thread.

8. A system comprising:
   at least one processor; and
   at least one non-transitory computer-readable storage medium storing instructions that, when executed by the at least one processor, cause a receiving client device to:
   identify, an ephemeral message, an ephemeral message duration setting, and an ephemeral setting timestamp generated by a transmitting client device;
   add the ephemeral message to a message thread between the receiving client device and the transmitting client device, wherein the message thread corresponds to an existing ephemeral message duration setting on the receiving client device;
   compare the ephemeral setting timestamp to an existing setting timestamp on the receiving client device;
   based on determining that the existing setting timestamp predates the ephemeral setting timestamp, modify the existing ephemeral message duration setting for the message thread to the ephemeral message duration setting; and
   apply the ephemeral message duration setting to delete the ephemeral message from the message thread on the receiving client device.

9. The system of claim 8, further comprising instructions that, when executed by the at least one processor, cause the system to identify the ephemeral message, the ephemeral message duration setting, and the ephemeral setting timestamp by:
   receiving one or more encrypted digital communications generated and sent by the transmitting client device; and
   decrypting the one or more encrypted digital communications to identify the ephemeral message, the ephemeral message duration setting, and the ephemeral setting timestamp.

10. The system of claim 8, further comprising instructions that, when executed by the at least one processor, cause the system to:
    receive a second ephemeral message; add the second ephemeral message to the message thread; and
    apply the ephemeral message duration setting to delete the second ephemeral message from the message thread on the receiving client device.

11. The system of claim 8, further comprising instructions that, when executed by the at least one processor, cause the system to:
    identify an existing message in the message thread; and
    based on determining that the existing message predates the ephemeral setting timestamp, apply the existing ephemeral message duration setting to delete the message from the message thread on the receiving client device.

12. The system of claim 8, further comprising instructions that, when executed by the at least one processor, cause the system to:
    generate a notification of the ephemeral message duration setting; and
    present, in a message thread graphical user interface on the receiving client device, the notification of the ephemeral message duration setting.

13. The system of claim 8, wherein the ephemeral message is a broadcast ephemeral messages generated by the transmitting client device for distribution to a plurality of receiving client devices to be deleted in accordance with a plurality of ephemeral message duration settings.

14. The system of claim 8, further comprising instructions that, when executed by the at least one processor, cause the system to:

detect, at the receiving client device, a user interaction with the ephemeral message in the message thread; and in response to determining that a time duration after the user interaction exceeds the ephemeral message duration setting, delete the ephemeral message from the message thread.

15. A non-transitory computer-readable medium storing instructions that, when executed by at least one processor, cause a receiving client device to:

identify, an ephemeral message, an ephemeral message duration setting, and an ephemeral setting timestamp generated by a transmitting client device;

add the ephemeral message to a message thread between the receiving client device and the transmitting client device, wherein the message thread corresponds to an existing ephemeral message duration setting on the receiving client device;

compare the ephemeral setting timestamp to an existing setting timestamp on the receiving client device;

based on determining that the existing setting timestamp predates the ephemeral setting timestamp, modify the existing ephemeral message duration setting for the message thread to the ephemeral message duration setting; and apply the ephemeral message duration setting to delete the ephemeral message from the message thread on the receiving client device.

16. The computer-readable medium of claim 15, further comprising instructions that, when executed by the at least one processor, cause the transmitting client device to identify the ephemeral message, the ephemeral message duration setting, and the ephemeral setting timestamp by:

receiving one or more encrypted digital communications generated and sent by the transmitting client device; and decrypting the one or more encrypted digital communications to identify the ephemeral message, the ephemeral message duration setting, and the ephemeral setting timestamp.

17. The computer-readable medium of claim 15, further comprising instructions that, when executed by the at least one processor, cause the transmitting client device to:

receive a second ephemeral message;

add the second ephemeral message to the message thread; and apply the ephemeral message duration setting to delete the second ephemeral message from the message thread on the receiving client device.

18. The computer-readable medium of claim 15, further comprising instructions that, when executed by the at least one processor, cause the transmitting client device to: identify an existing message in the message thread; and based on determining that the existing message predates the ephemeral setting timestamp, apply the existing ephemeral message duration setting to delete the message from the message thread on the receiving client device.

19. The computer-readable medium of claim 15, further comprising instructions that, when executed by the at least one processor, cause the transmitting client device to:

generate a notification of the ephemeral message duration setting; and present, in a message thread graphical user interface on the receiving client device, the notification of the ephemeral message duration setting.

20. The computer-readable medium of claim 15, wherein the ephemeral message is a broadcast ephemeral messages generated by the transmitting client device for distribution to a plurality of receiving client devices to be deleted in accordance with a plurality of ephemeral message duration settings.

* * * * *